(12) United States Patent
Evenson et al.

(10) Patent No.: US 10,860,457 B1
(45) Date of Patent: Dec. 8, 2020

(54) GLOBALLY ORDERED EVENT STREAM LOGGING

(71) Applicant: Amazon Technologies, Inc., Seattle, WA (US)

(72) Inventors: Andrew Evenson, Seattle, WA (US); Robert McGregor Calhoun, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 16/277,898

(22) Filed: Feb. 15, 2019

(51) Int. Cl.
*G06F 15/16* (2006.01)
*G06F 11/34* (2006.01)
*H04L 29/08* (2006.01)
*G06F 11/28* (2006.01)

(52) U.S. Cl.
CPC .......... *G06F 11/3495* (2013.01); *G06F 11/28* (2013.01); *G06F 11/3409* (2013.01); *G06F 11/3476* (2013.01); *H04L 67/1002* (2013.01); *G06F 2201/835* (2013.01); *G06F 2201/86* (2013.01)

(58) Field of Classification Search
CPC .. G06F 11/3495; G06F 11/28; G06F 11/3409; G06F 11/3476; G06F 2201/835; G06F 2201/86; H04L 67/1002
See application file for complete search history.

(56) References Cited

U.S. PATENT DOCUMENTS

| | | | |
|---|---|---|---|
| 6,148,338 A | 11/2000 | Lachelt et al. | |
| 7,155,448 B2* | 12/2006 | Winter | G11B 27/36 711/4 |
| 7,529,979 B2 | 5/2009 | Dombrowa et al. | |
| 7,685,143 B2 | 3/2010 | Tsui et al. | |
| 8,748,012 B2 | 6/2014 | Zeng et al. | |
| 9,369,355 B1* | 6/2016 | Zigmond | H04L 43/04 |
| 9,628,829 B2* | 4/2017 | Li | H04N 21/42203 |
| 10,091,178 B2* | 10/2018 | Phirmis | G06F 21/10 |
| 10,419,785 B2* | 9/2019 | Davies | H04N 19/154 |

(Continued)

OTHER PUBLICATIONS

Gwen Shapira, et al., "Apache Kafka for Beginners", Retrieved from URL: http://blog.cloudera.com/blog/2014/09/apache-kafka-for-beginners/, Sep. 2014, pp. 1-16.

(Continued)

*Primary Examiner* — Moustafa M Meky
(74) *Attorney, Agent, or Firm* — Robert C. Kowert; Kowert, Hood, Munyon, Rankin & Goetzel, P.C.

(57) ABSTRACT

Methods, systems, and computer-readable media for globally ordered event stream logging are disclosed. A first host of a plurality of hosts generates an additional chain of a stream comprising a plurality of chains and representing a globally ordered sequence of events. The first host sends information describing the additional chain to a second host. The second host receives a request to store a data object representing an event. The request is associated with a stream identifier of the stream. The second host stores, in the additional chain, the data object, a timestamp associated with the data object, and an identifier of the second host. The data object in the additional chain is associated with a position in the globally ordered sequence across the plurality of chains.

20 Claims, 21 Drawing Sheets

(56) References Cited

U.S. PATENT DOCUMENTS

| | | | | |
|---|---|---|---|---|
| 2013/0347017 A1* | 12/2013 | Li | ............... | H04N 21/4126 |
| | | | | 725/18 |
| 2017/0188061 A1* | 6/2017 | Li | ............... | H04N 21/4223 |
| 2019/0028741 A1* | 1/2019 | Davies | ............ | H04N 21/23406 |
| 2019/0243854 A1* | 8/2019 | Narasimha | ............ | G06F 16/784 |
| 2019/0244053 A1* | 8/2019 | Narasimha | ......... | G06K 9/00228 |

OTHER PUBLICATIONS

Amazon Web Services, "Amazon Kinesis Streams Developer Guide", Updated Apr. 19, 2016, pp. 1-136.

Jef Barr, "Sneak Preview—DynamoDB Streams", Retrieved from URL: https://aws.amazon.com/blogs/aws/dynamodb-streams-preview/, Nov. 2014, pp. 1-4.

U.S. Appl. No. 15/192,776, filed Jun. 24, 2016, Andrew Ross Evenson.

* cited by examiner

GLOBALLY ORDERED EVENT STREAM LOGGING

BACKGROUND

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems has increased, the tasks of provisioning, administering, and managing the computing resources have become increasingly complicated.

Such a distributed system may encompass numerous subsystems that work in concert. For example, a distributed system operated by an online merchant may include an ordering system that processes the generation and/or modification of customer orders of goods and/or services. The same distributed system operated by the online merchant may also include a logging system that stores log entries related to orders. When a modification to an order is desired, a log entry may be generated using the logging system to create a persistent record of the order modification. If the logging system is offline, aspects of the ordering system may be unavailable or broken due to the dependency between the ordering system and the logging system. Such downtime may cause the online merchant to lose sales and may create an undesirable experience for customers.

Figure 1:
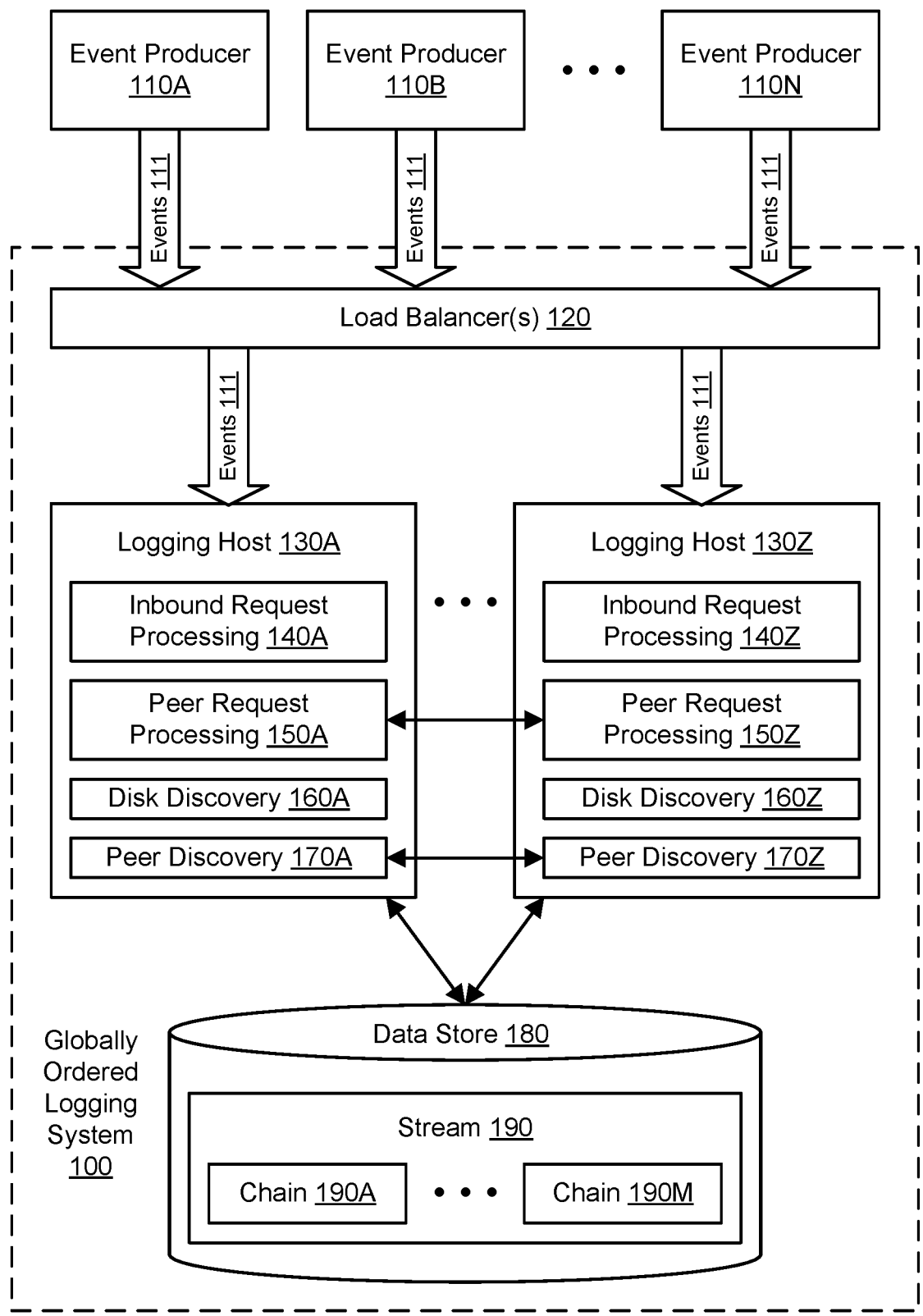
FIG. 1 illustrates an example system environment for globally ordered event stream logging, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for globally ordered event stream logging are described. A data store such as a key-value data store or distributed hash table (DHT) may store a set of event chains. A chain may represent a highly available, low latency, and durable log for a sequence of events produced by one or more event producers. The chain may be appended to at the head, iterated in either direction, and truncated at the tail. A stream may include a plurality of such chains, and chains may also be referred to as shards of a stream. Events may be logged across different chains of a stream so that the global ordering of the events can be derived, even for events in different chains. A fleet of hosts may log events to chains, and a particular host may be said to own a particular chain such that requests to log events to that chain may be forwarded to the particular host from other (peer) hosts. A host may discover information about chain ownership and the existence of other hosts via disk discovery, e.g., when examining a chain in the data store. Hosts may also exchange such information via peer discovery, e.g., while forwarding or receiving peer requests. Hosts may also exchange their local clock times, and a host may log an event with a timestamp that is approximated based (at least in part) on the host's own clock time, the clock times of one or more other hosts, and/or the timestamp of a previously recorded event in the chain. In addition to such timestamps, events may be recorded with sequence numbers within the chain and optional references to other events in other chains so that the global order of events may be determined. The number of chains in the stream may grow or shrink dynamically based (at least in part) on metrics such as an append rate of events to one or more chains of the stream. By permitting events to be logged to multiple chains of the same stream in a manner that permits a global order of events to be determined, the logging system may offer high availability as well as efficient use of computational and storage resources.

As one skilled in the art will appreciate in light of this disclosure, embodiments may be capable of achieving certain technical advantages, including some or all of the following: (1) improving the availability and throughput of event logging using a fleet of hosts by dynamically expanding the number of chains (shards) of a stream representing a sequence of events; (2) decreasing idle or underutilized computational and storage resources by dynamically shrinking the number of chains (shards) of a stream representing a sequence of events and concentrating a workload on a smaller number of hosts; (3) improving the latency of event searching by dynamically shrinking the number of chains (shards) of a stream representing a sequence of events; (4) improving the usability of event data by logging events across multiple chains with data indicative of the global ordering of the events; (5) improving the accessibility of data by maintaining an event stream indefinitely; and so on.

FIG. 1 illustrates an example system environment for globally ordered event stream logging, according to some embodiments. A globally ordered logging system 100 may capture data indicative of events 111 in various chains 190A-190M of a stream 190 maintained in a data store 180. The data indicative of events 111 may also be referred to simply as events, and a log entry representing an event may be referred to as an element of the chain. Events 111 may represent transactions, status changes, status reports, and/or other updates with respect to one or more systems, data sets, data stores, and/or any other suitable items. For example, the events 111 may relate to financial transactions, orders in a marketplace, accounting transactions, updates to gift card balances, and so on. Individual events may often represent relatively small amounts of data, e.g., as supplied in byte arrays. In one embodiment, events may be logged using versioned data for efficient use of the data store 180. A chain of events may be appended to at the head, iterated in either direction, and truncated at the tail, with records in the chain generally deemed immutable. The logging system 100 may be idempotent such that any given event will be represented once and only once in the stream. A stream may represent a complete log of changes with a global ordering that can be derived from data logged with events across different chains of a stream. In one embodiment, a stream can be searched forward or backward from a point in time or a particular event.

The events 111 may be generated and provided to the logging system 100 by a plurality of event producers 110A-110N. Although three event producers 110A, 110B, and 110N are shown for purposes of illustration and example, it is contemplated that any suitable number and configuration of event producers may be used to feed events to the logging system 1000. The event producers 110A-110N and other clients of the logging system 100 may represent different processes, systems, and/or computing devices. The event producers 1010A-1010N and other clients of the logging system 100 may be distributed on multiple computing devices throughout one or more networks, including private networks and/or public networks such as the Internet. The event producers 110A-110N and other clients of the logging system 100 may also be coupled to the logging system through one or more networks, including private networks and/or public networks such as the Internet. As will be discussed in greater detail below, the event producers 110A-110N and other clients of the logging system 100 may interact with the logging system using one or more suitable interfaces, such as one or more application programming interfaces (APIs), e.g., to invoke the functionality of the logging system.

The chains 190A-190M may be stored in one or more data stores such as data store 180. In one embodiment, the data store 180 may represent a key-value data store that stores key-value pairs using any suitable storage technology. The keys may represent identifiers of portions of the chains, and the corresponding values may represent the contents of those portions (including elements that represent events). In one embodiment, the data store 180 may represent a distributed hash table (DHT). To store key-value pairs, the DHT may be implemented as a decentralized system that offers a lookup service similar to a hash table. In on embodiment, any participating node of the DHT may efficiently retrieve the value associated with a given key. The DHT may scale to very large numbers of nodes and may be capable of handling node arrivals, node departures, and node failures. In one embodiment, the data store 180 supports operations such as conditional put, conditional delete, and get in order to interact with the logging system 100.

The data store 180 may store multiple streams, each having its own set of chains. When a stream is created (e.g., by an event producer or other client invoking a particular API), the stream may be assigned a stream identifier. The stream identifier may include an alphanumeric identifier. The stream identifier may also indicate the number of chains (shards) in the stream. For example, the identifier for a stream named ABC may be ABC:3 if the stream initially includes three chains. The number of chains in the stream may be determined based on input to the API that creates the stream or based on a default or pre-configured value. In one embodiment, a stream may not have fewer than a predetermined minimum number of chains (e.g., 2), even as the number of chains dynamically grows and shrinks over time. In one embodiment, the name or identifier of a chain of a stream may be derived from the stream identifier. For example, given a stream identifier ABC:3, the individual chains may be identified as ABC:3:0, ABC:3:1, and ABC:3:2. The initially created chains for a stream may be referred to as root chains, and child chains may be added to the stream from parent chains such as root chains. Individual chains may also be referred to as buffer chains and are discussed in greater detail below, e.g., with respect to FIG. 5A through FIG. 10.

The logging system 100 may include various components or functionalities. In one embodiment, the logging system 100 may include one or more load balancers 120. The load balancer(s) 120 may accept requests to log events 111 from event producers 110A-110N and may route those requests to appropriate logging hosts of a fleet of logging hosts 130A-130Z. The load balancer(s) 120 may route requests based (at least in part) on the availability or latency of various hosts 130A-130Z, e.g., to balance the load across the fleet. In one embodiment, particular hosts may be said to "own" particular chains, but the load balancer(s) 120 may route requests to hosts without regard to such ownership claims. Individual hosts may instead determine chain ownership using disk discovery and/or peer discovery and may route requests to other hosts accordingly. In one embodiment, the fleet of hosts 130A-130Z may be scaled up or down as needed, e.g., by provisioning additional hosts from a pool of available compute instances to meet additional logging traffic and/or returning hosts to the pool of available compute instances when logging traffic decreases. The fleet of hosts may be implemented using computational resources of a multi-tenant provider network.

In one embodiment, a logging host may include a component for inbound request processing, such as inbound request processing 140A for logging host 130A and inbound request processing 140Z for logging host 130Z. Using the inbound request processing, a host may process a request to log an event from the load balancer(s) 120. In one embodiment, when a host receives an inbound request, the host may randomly select one of the chains in the stream for logging the event. The identifier of the selected chain may be derived from the stream identifier, where the stream identifier indicates the number of chains as discussed above. In one embodiment, a host may log an event from an inbound request to a selected chain if the host examines the contents (if any) of the chain in the data store 180 and determines that no other host "owns" the chain. In one embodiment, a logging host may include a component for peer request processing, such as peer request processing 150A for logging host 130A and peer request processing 150Z for logging host 130Z. Using the peer request processing, a host may process a request to log an event from another host. In one embodiment, a host may process an inbound request by forwarding the request to another host as a peer request, e.g., if the host determines that the other host owns or last modified the particular chain. In one embodiment, a host that receives such a peer request may log the event in the request to the selected chain.

Hosts may obtain information about chains 190A-190M and other hosts using both disk discovery and peer discovery. In one embodiment, a logging host may include a component for disk discovery, such as disk discovery 160A for logging host 130A and disk discovery 160Z for logging host 130Z. Using the disk discovery, a host may examine the contents (if any) of a chain in the data store 180 to discover the existence of other hosts, the ownership status (if any) of the chain with respect to another host, and so on. In one embodiment, a logging host may include a component for peer discovery, such as peer discovery 170A for logging host 130A and peer discovery 170Z for logging host 130Z. Using the peer discovery, hosts may exchange information regarding the existence of other hosts, the existence of chains in the stream, the ownership status (if any) of chains with respect to other hosts, the health or availability of other hosts, the clock times at other hosts, and so on. The information discovered from disk and/or peer exchange may be used for routing of inbound requests to other hosts (e.g., hosts that "own" or last modified particular chains or hosts that can handle more throughput). The information discovered from disk and/or peer exchange may also be used for generation of approximate timestamps that can be logged to disk with events and potentially used to determine the global ordering of events in different chains of the stream 190. The disk discovery may be used to implement a "best effort" leader election strategy based (at least in part) on the last host to update a chain, if the host is available. A new host may claim ownership of a chain if the previous owner is unreachable or unresponsive.

In one embodiment, the logging system 100 may order events using both wall clock time and chain time. Wall clock time may represent the traditional system time taken from the clock of a computing system such as a logging host. Chain time may represent the sequence number of an event within a chain. Events in a particular chain may be internally ordered by definition. The logging system 100 may weave multiple chains of a stream into a global ordering using cross-pollination of wall clock times from different hosts as well as chain times and other metadata (e.g., "happens before" and/or "happens after" references to other events) to determine approximate timestamps for events. The cross-pollination of time data may permit the logging system 100 to determine the global order of events and also construct stable wall clock approximations that do not suffer from clock skew at individual hosts.

The logging system 100 may distribute events across a set of chains to avoid high throughput (in transactions per second or TPS) against an individual chain. The logging hosts that flush to each chain may bundle any number of events into a single flush to the underlying data store 180. However, the more events that are bundled, the larger the flush, and the more write units are used. Thus, to distribute heat, multiple chains may be employed in a stream. The volume of events may grow to a large enough number that additional chains may be spawned to maintain high availability and low latency. Excessively high or low volume to a chain may be detected by generally restricting chain updates to be performed by a single host. To spawn a new chain, an entry into the parent chain may be logged with the chain ID of the child chain. The child may continue to exist until its death is recorded in the child itself. During its life, the parent may include the child reference continuously in all updates. Thus the logging system 100 may deterministically know the identities of all chains in a stream at any given point in time.

In one embodiment, the logging system 100 may implement high read fan-out. The logging system 100 may permit hundreds or thousands of consumers to read from the same stream in a substantially concurrent manner. To enable the high read fan-out, the logging system 100 may enable caching such that most reads of the stream are served from caches of the log (not head) content. To enable the high read fan-out, the logging system 100 may also enable read/write separation. While a single host may performs most or all writes to a given chain in the stream, any host may perform the read from the chain. In one embodiment, each host may also have a limited cache of history nodes so that very high TPS streams get some edge-caching benefit.

It is contemplated that the logging system 100 may include additional components not shown, fewer components than shown, or different combinations, configurations, or quantities of the components shown. The logging system 100 may comprise one or more computing devices, any of which may be implemented by the example computing device 3000 illustrated in FIG. 11. In various embodiments, portions of the logging system 100 may be provided by the same computing device or by any suitable number of different computing devices. If any of the components of the logging system 100 are implemented using different computing devices, then the components and their respective computing devices may be communicatively coupled, e.g., via a network. Each of the illustrated components may represent any combination of software and hardware usable to perform their respective functions.

In one embodiment, the functionality of the logging system 100 may be provided to event producers 110A-110N and other clients as a web-accessible service. The functionality of the logging system 100 may be presented to clients using a provider network. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

The logging hosts 130A-130Z may be distributed on multiple computing devices throughout one or more networks, including private networks and/or public networks such as the Internet. In one embodiment, at least some of the functionality of the logging system 100 may be implemented as a library of functions, and the logging hosts 130A-130Z may represent implementations of the library. For example, the event producers 110A-110N may represent programs that include the library in their program code. Using the logging system 100 as implemented using the logging hosts 130A-130Z, multiple entities may access a chain concurrently, e.g., to read elements from the chain, delete elements from the chain, iterate through the chain, search in the chain, and so on. The distributed nature of the logging system 100 may enable many logging hosts to read a large chain more quickly than a single logging host could perform the same task. In some embodiments, a plurality of entities within the logging system 100 may access a plurality of chains concurrently, e.g., to read elements from the chains, delete elements from the chains, iterate through the chains, search in the chains, and so on.

The logging system 100 may perform mutating operations (e.g., addition and deletion) in a first-in, first-out manner. The logging system 100 may perform read operations using random access and/or sequential access. The logging system 100 may be especially useful for maintaining logs in many types of domains, including financial transaction logs, job processing logs, event stream logs, and so on. The logging system 100 and logging hosts 130A-130Z may represent stateless components with persistence managed by the data store 180. In one embodiment, the logging hosts 130A-130Z may not use a formal leader election system to assign ownership of chains. For a single chain, the availability for the logging system 100 as a whole may be equivalent to the availability of a single file (representing the head of a chain) in the data store 180. For many chains, the availability for the logging system 100 as a whole may be equivalent to the availability of the underlying data store 180. For stateful clients (e.g., clients that can pass in the result of the last put to a chain), the latency of the logging system 100 may be equivalent to a single conditional put to the data store. By storing the elements in multiple records, the logging system 100 may scale to chains of an indefinitely large size if the underlying data store 180 permits. By storing nodes with a sequential numbering scheme within a chain, random access of nodes may be performed without a need to link from node to node or without a need to keep the nodes linked within the head or otherwise synchronized with the head.

Figure 2A:
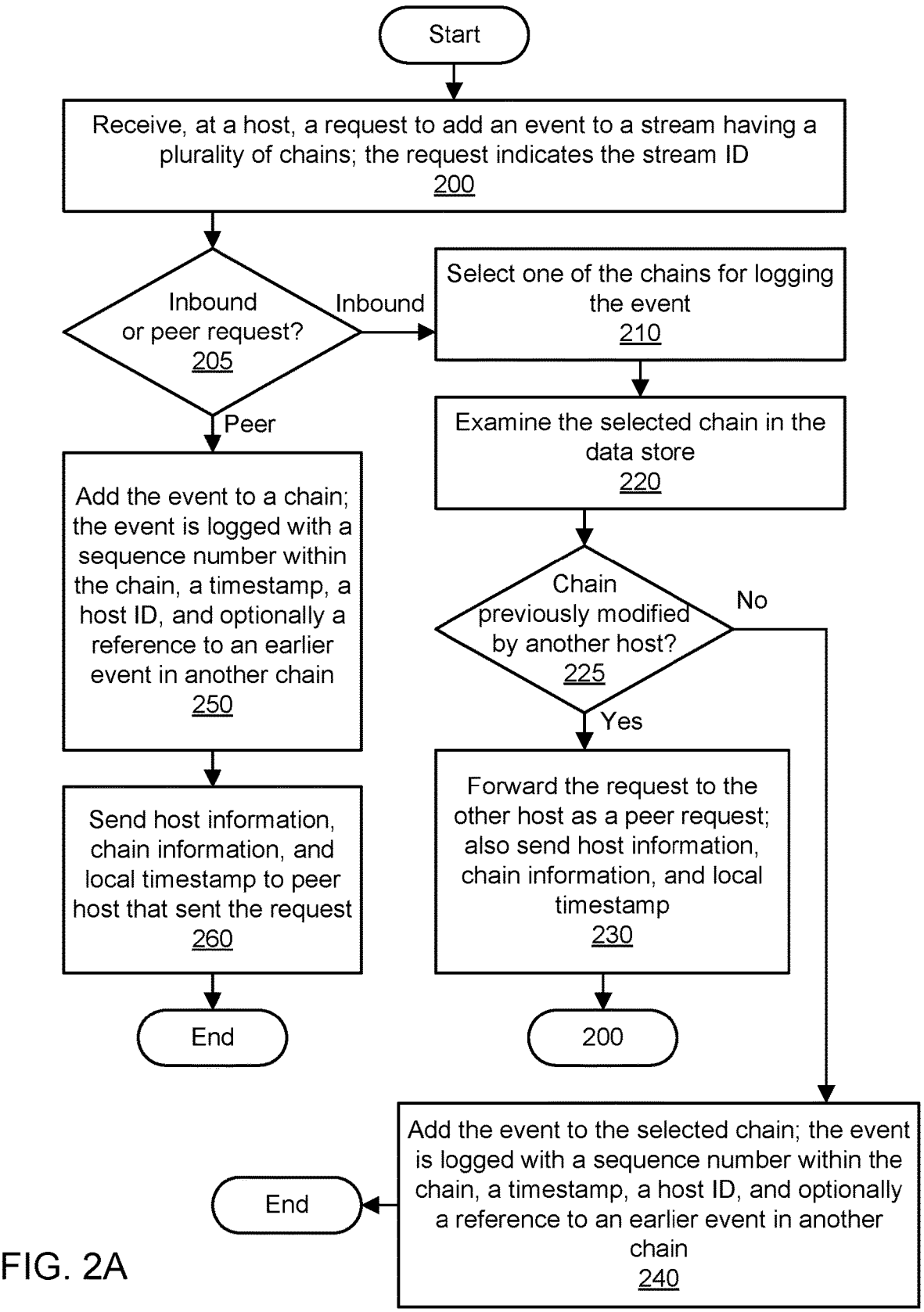
FIG. 2A and FIG. 2B are flowcharts illustrating methods for globally ordered event stream logging, according to some embodiments.

FIG. 2A is a flowchart illustrating a method for globally ordered event stream logging, according to some embodiments. As shown in 200, a host may receive a request to add an event to a stream. The stream may have a plurality of chains, and the number of chains may be indicated in the stream identifier associated with the request. The event may include a byte array or other data structure. The request may be received via a load balancer that distributes traffic among a fleet of logging hosts or another host in the fleet. As shown in 205, the method may determine whether the request is an inbound request (e.g., from a load balancer) or a peer request (e.g., from another host). The host may process peer requests differently from inbound requests.

As shown in 210, if the request is an inbound request, the host may select one of the chains of the identified stream for logging the event. The stream identifier may indicate the number of chains (shards) in the stream. For example, the identifier for a stream named ABC may be ABC:3 if the stream initially includes three chains. In one embodiment, the name or identifier of a chain may be derived from the stream identifier. For example, given a stream identifier ABC:3, the individual chains may be identified as ABC:3:0, ABC:3:1, and ABC:3:2. In one embodiment, the host may randomly select one of these chains for logging the event.

As shown in 220, the host may examine the selected chain in the data store via the chain identifier (e.g., ABC:3:0) derived from the stream identifier. In this process referred to as disk discovery, the host may determine whether the chain has previously been modified by logging any events, and if so, the host may determine the identity of the last host that appended to the chain. As shown in 225, the method may determine whether the chain has previously been modified by another host. If so, the method may identify the host that last logged to the chain. This host may be deemed to be the owner of the chain.

As shown in 230, the host may forward the request to log the event to the other host that owns the chain. The request sent to the other host may be considered a peer request. The request may indicate the chain identifier previously selected in 210. In sending the peer request, the host may send additional information to the other host, such as information indicative of other hosts known to the host, information indicative of other chains known to the host, and a local timestamp (e.g., wall clock time) at the host. For example, the information may indicate a known ownership of particular hosts and particular chains. As another example, the information may indicate new or unowned chains of the stream for which the recipient host can claim ownership. As a further example, the information may indicate health information for hosts such as their reachability (or lack thereof), estimated throughput in transactions per second, and estimated latency of performing logging operations. Via this process of peer discovery, hosts may learn about the state of the fleet and the state of the chains as well as acquire clock information that can be used to compute a stable increasing wall clock time for logged events. The method may proceed with the operation shown in 200.

If the chain was not previously modified by another host, then the ownership of the chain can be claimed by this host. Similarly, if the target of the peer request does not respond, then the ownership of the chain can be claimed by this host. As shown in 240, the host may log the event itself, a sequence number within the chain (increasing with each additional event), a timestamp, and the identifier of the host performing the logging. In one embodiment, the timestamp may be calculated based on one or more sources of input. For example, the timestamp may be using the wall clock time from the logging host and potentially also from one or more peer hosts, e.g., as acquired via peer discovery. In one embodiment, the timestamp of the current event may only be later than the timestamp of an earlier-logged event in this chain or in another chain and known to this host. In one embodiment, the host may also log a reference to an earlier event in another chain. This reference may represent "happens after" metadata that can be used to reconstruct a global order of events across different chains. The sequence numbers within a chain may be used to construct the order of events within that chain. In one embodiment, upon successful logging of the event, the host may respond to the load balancer (which may then respond to the client) with an acknowledgement of the successful logging and an event identifier that captures the stream, the chain, and the sequence number within the chain (e.g., ABC:3:0:0).

As shown in 250, if the request is a peer request received from another host, then the recipient host may add the event to a chain. In one embodiment, the recipient host may select any chain of the stream that is owned by the host. In one embodiment, the recipient host may select a chain based (at least in part) on state information maintained by the host in order to optimize the logging. In one embodiment, the host may select the same chain that was selected by the host that generated the peer request, e.g., if the host owns only that one chain. However, the recipient host may reach a different decision if it has more knowledge about chains than the host that sent the peer request. The host may log the event itself, a sequence number within the chain (increasing with each additional event), a timestamp, and the identifier of the host performing the logging. In one embodiment, the timestamp may be calculated based on numerous sources of input. For example, the timestamp may be determined as a mean or median of wall clock times from the logging host and also from one or more peer hosts, e.g., as discovered via the peer request and/or other peer discovery. In one embodiment, the timestamp of the current event may only be later than the timestamp of an earlier-logged event in this chain or in another chain and known to this host. In one embodiment, the host may also log a reference to an earlier event in another chain. This reference may represent "happens after" metadata that can be used to reconstruct a global order of events across different chains. Again, the sequence numbers within a chain may be used to construct the order of events within that chain. In one embodiment, upon successful logging of the event, the host may respond to the host that sent the peer request (which may then respond to the load balancer, which may then respond to the client) with an acknowledgement of the successful logging and an event identifier that captures the stream, the chain, and the sequence number within the chain (e.g., ABC:3:0:1).

As shown in 260, the recipient of the peer request may respond to the sender of the peer request with host information, chain information, and the local timestamp (e.g., wall clock time) of the host. For example, the information may indicate a known ownership of particular hosts and particular chains. As another example, the information may indicate new or unowned chains of the stream for which the recipient host can claim ownership. As a further example, the information may indicate health information for hosts such as their reachability, estimated throughput in transactions per second, and estimated latency of performing logging operations. Via this process of peer discovery, hosts may learn about the state of the fleet and the state of the chains as well as acquire clock information that can be used to compute a stable increasing wall clock time for logged events.

Figure 2B:
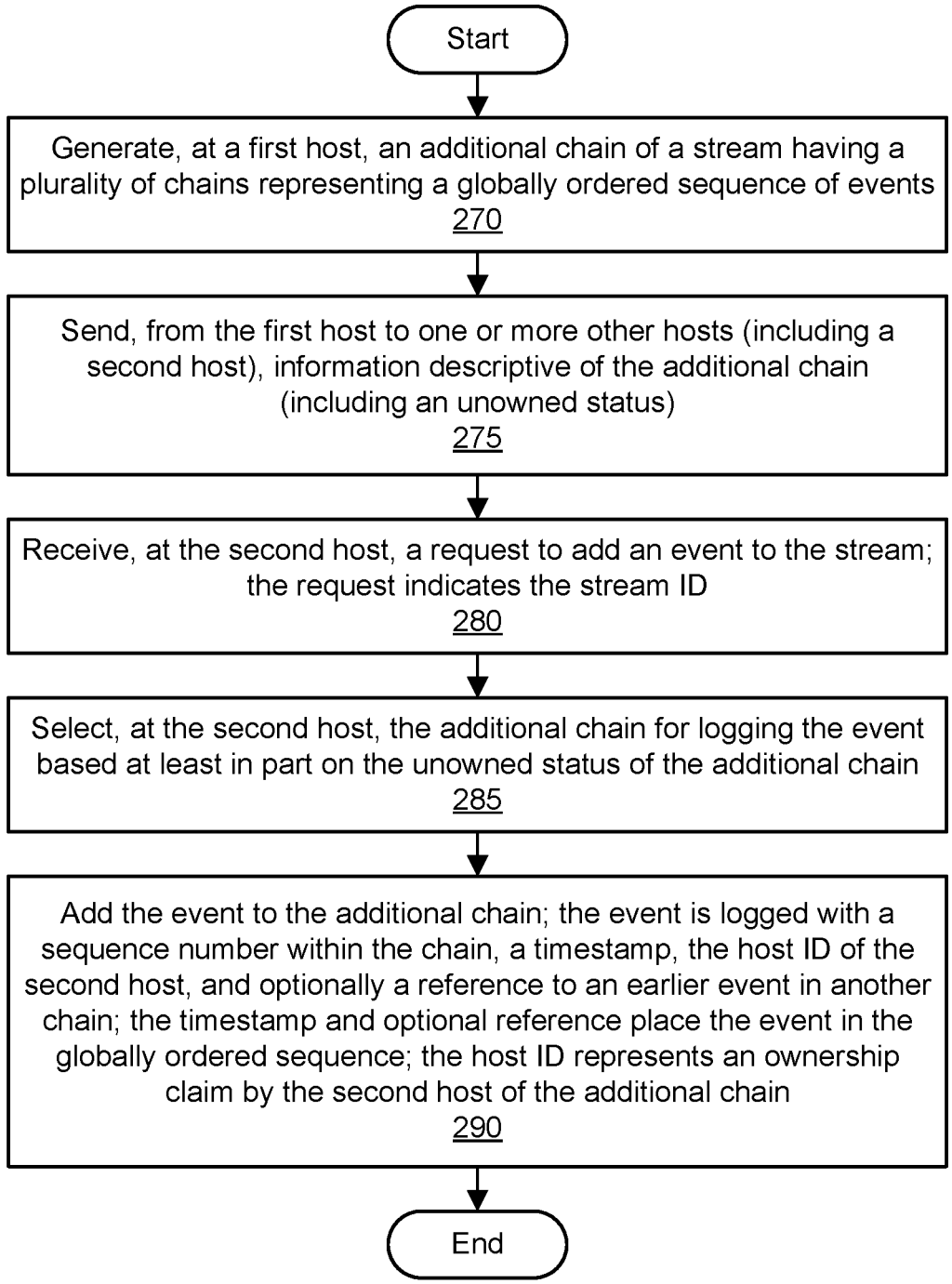

FIG. 2B is a flowchart illustrating a method for globally ordered event stream logging, according to some embodiments. As shown in 270, a first host of a fleet of hosts may generate an additional chain of a stream. The stream may include a plurality of existing chains prior to the addition. The stream may represent a globally ordered sequence of events. The first host may decide to add the additional chain based (at least in part) on one or more performance metrics associated with the first host. For example, the first host may be under strain as evidenced by a high throughput metric, and the first host may seek to reduce its strain by adding a chain to the set of chains of the stream. The additional chain may represent a child chain of a parent chain that is "owned" by the first host. As shown in 275, the first host may send information descriptive of the additional chain to one or more other hosts, such as a second host. The information may include an identifier of the additional chain and an unowned and/or newly created status of the additional chain.

As shown in 280, the second host may receive a request to add an event to a stream. The event may include a byte array or other data structure. The request may be received via a load balancer that distributes traffic among a fleet of logging hosts or another host in the fleet. As shown in 285, the second host may select the additional chain for logging the event. In one embodiment, the second host may select the additional chain based (at least in part) on the unowned status of the additional chain. The request may include a stream identifier of the stream that includes the additional chain. In one embodiment, the additional chain may be identified based (at least in part) on the stream identifier.

If the additional chain was not previously modified or otherwise claimed by another host, then the ownership of the chain can be claimed by the second host. As shown in 290, the second host may log the event itself, a sequence number within the chain (increasing with each additional event), a timestamp, and the identifier of the host performing the logging. In one embodiment, the timestamp may be calculated based on one or more sources of input. For example, the timestamp may be using the wall clock time from the logging host and potentially also from one or more peer hosts, e.g., as acquired via peer discovery. In one embodiment, the timestamp of the current event may only be later than the timestamp of an earlier-logged event in this chain or in another chain and known to this host. In one embodiment, the host may also log a reference to an earlier event in another chain. This reference may represent "happens after" metadata that can be used to reconstruct a global order of events across different chains. The sequence numbers within a chain may be used to construct the order of events within that chain. Metadata logged with the event such as the timestamp and the optional reference may be used to place the event in a globally ordered sequence across a plurality of chains of the stream. In one embodiment, the host identifier logged with the event may represent an ownership claim by the second host of the additional chain.

Figure 3A:
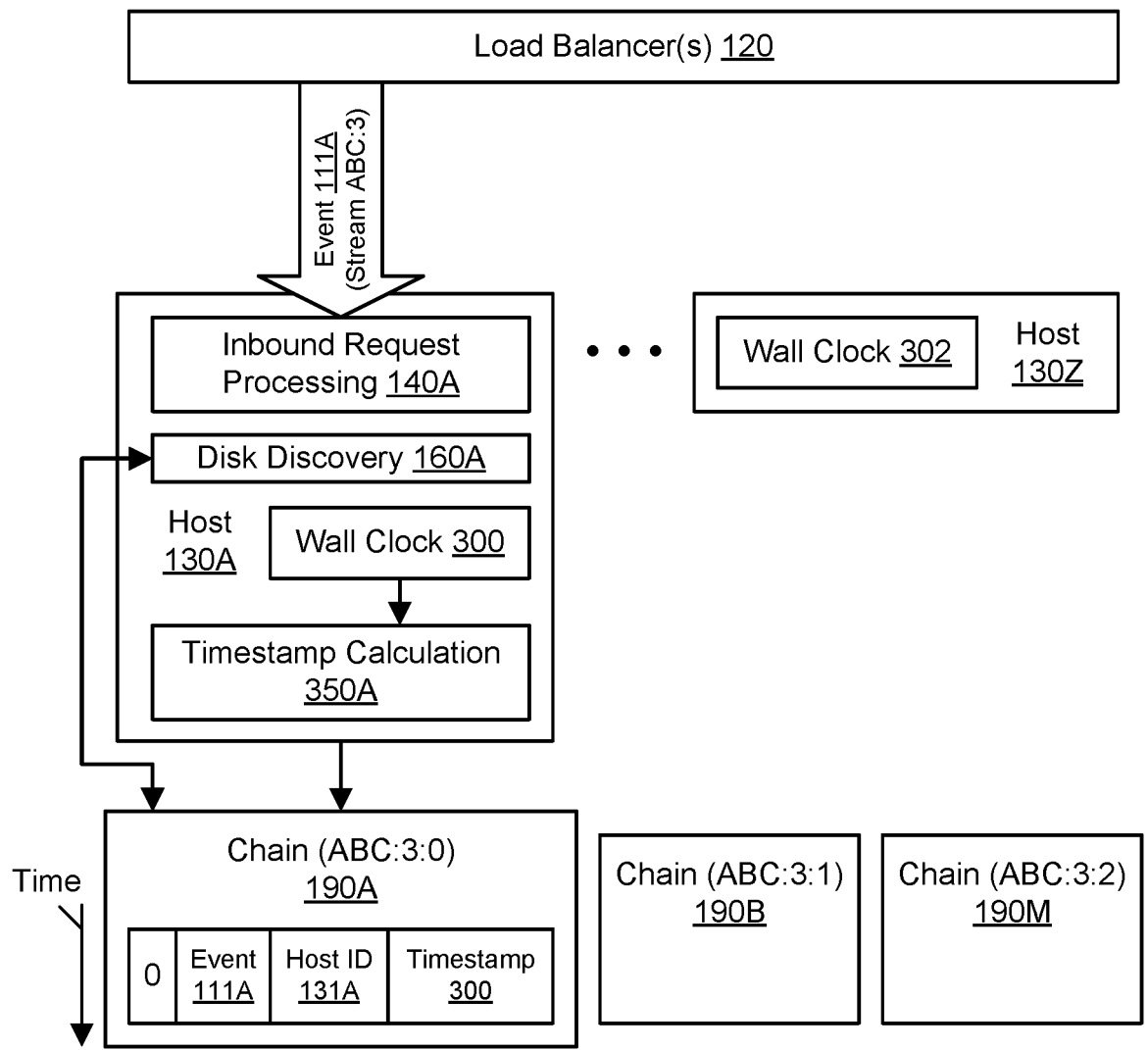
FIG. 3A through FIG. 3D illustrate examples of globally ordered event stream logging by multiple hosts in a stream with multiple chains, according to some embodiments.

FIG. 3A through FIG. 3D illustrate examples of globally ordered event stream logging by multiple hosts in a stream with multiple chains, according to some embodiments. As shown in FIG. 3A, a host 130A may receive a request to log an event 111A from the load balancer(s) 120. The event 111A may include or otherwise be associated with a stream identifier ABC:3, where the stream identifier indicates that the stream has three chains. Upon receipt of this request, the host 130A may select (e.g., at random) one of the chains of the stream for logging the event. For example, the host 130A may select the chain 190A with the identifier ABC:3:0 but not the chain 190B (having the identifier ABC:3:1) or the chain 190M (having the identifier ABC:3:2). Using disk discovery 160A, the host 130A may examine at least a portion of the chain 190A (e.g., the head of the buffer chain) to determine the status of the chain. As shown in the example of FIG. 3A, the chain 190A is previously unmodified, and so the host 130A may claim ownership. The host 130A may append the event 111A to the chain 190A along with a sequence number (zero) and the host's ID 131A.

In one embodiment, the host 130A may also log the event 111A with a wall clock time 300. The wall clock time 300 may be the current time at the host 130A when the event 111A is logged. At the same point in time, another host in the fleet may have a different wall clock time, e.g., wall clock 302 at host 130Z. However, as this other host 130Z is yet unknown to the host 130A, the host 130A is unable to use the wall clock 302 in performing a timestamp calculation 350A for the event 111A. In some embodiments, therefore, the host 130A may log the event 111A either with a timestamp 300 based on the host's own wall clock time 300 or a timestamp beginning at a sufficiently early point, e.g., zero. In one embodiment, upon successful logging of the event, the host 130A may respond to the load balancer (which may then respond to the client) with an acknowledgement of the successful logging and an event identifier that captures the stream, the chain, and the sequence number within the chain (e.g., ABC:3:0:0).

Figure 3B:
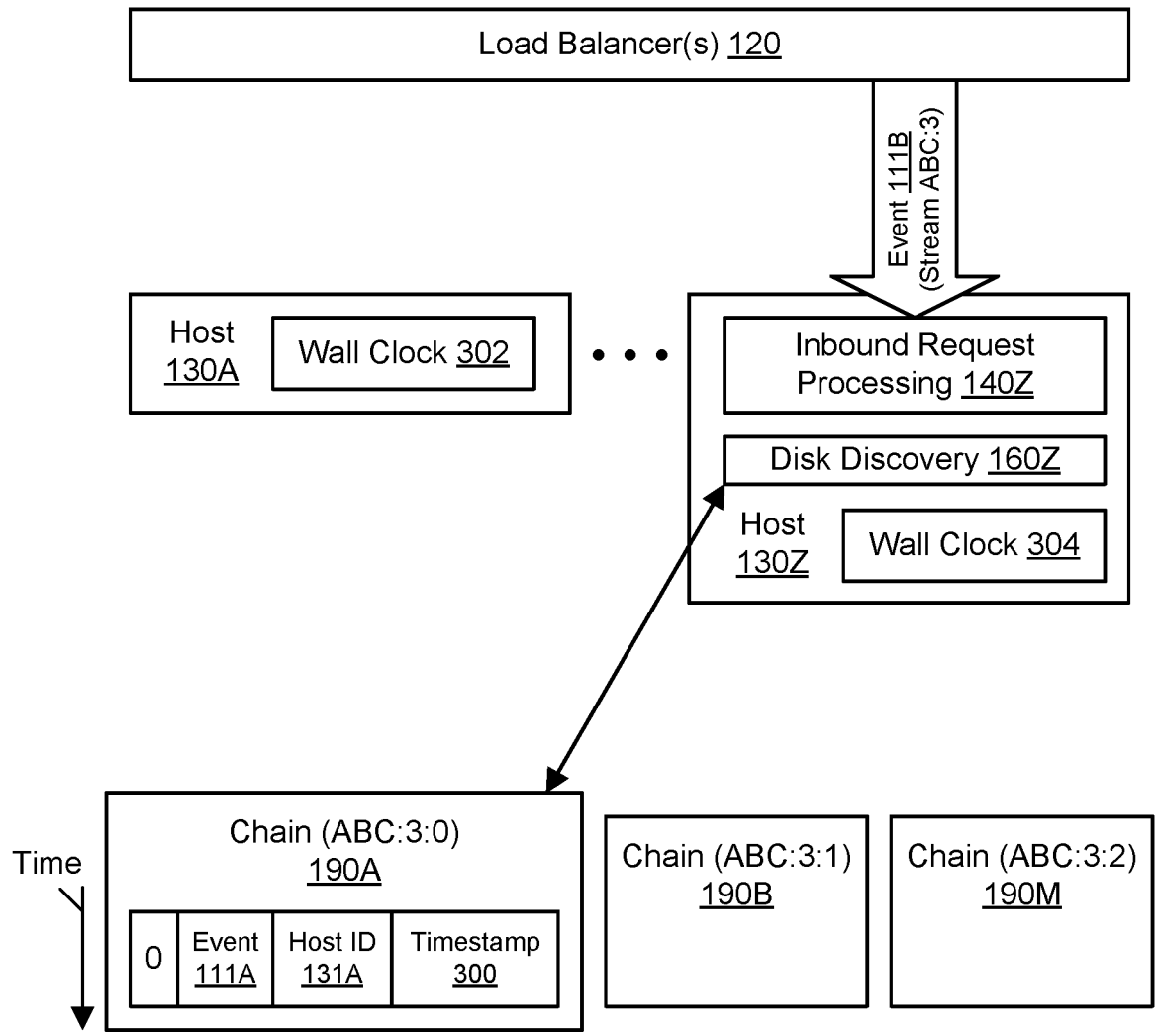

FIG. 3B continues the example of FIG. 3A at a later point in time. In particular, FIG. 3B may occur at wall clock time 302 at host 130A and wall clock time 304 at host 130Z. As shown in FIG. 3B, a host 130Z may receive a request to log an event 111B from the load balancer(s) 120. The event 111B may include or otherwise be associated with a stream identifier ABC:3, where the stream identifier indicates that the stream has three chains. Upon receipt of this request, the host 130Z may select (e.g., at random) one of the chains of the stream for logging the event. For example, the host 130Z may select the chain 190A with the identifier ABC:3:0 but not the chain 190B (having the identifier ABC:3:1) or the chain 190M (having the identifier ABC:3:2). Using disk discovery 160Z, the host 130Z may examine at least a portion of the chain 190A (e.g., the head of the buffer chain) to determine the status of the chain. As shown in the example of FIG. 3B, the chain 190A was most recently modified by the other host 130A (as indicated by the host ID 131A logged with event 111A), and so the host 130Z may not claim ownership of the chain but may instead seek to have the other host 130A perform the logging of the event 111B.

Figure 3C:
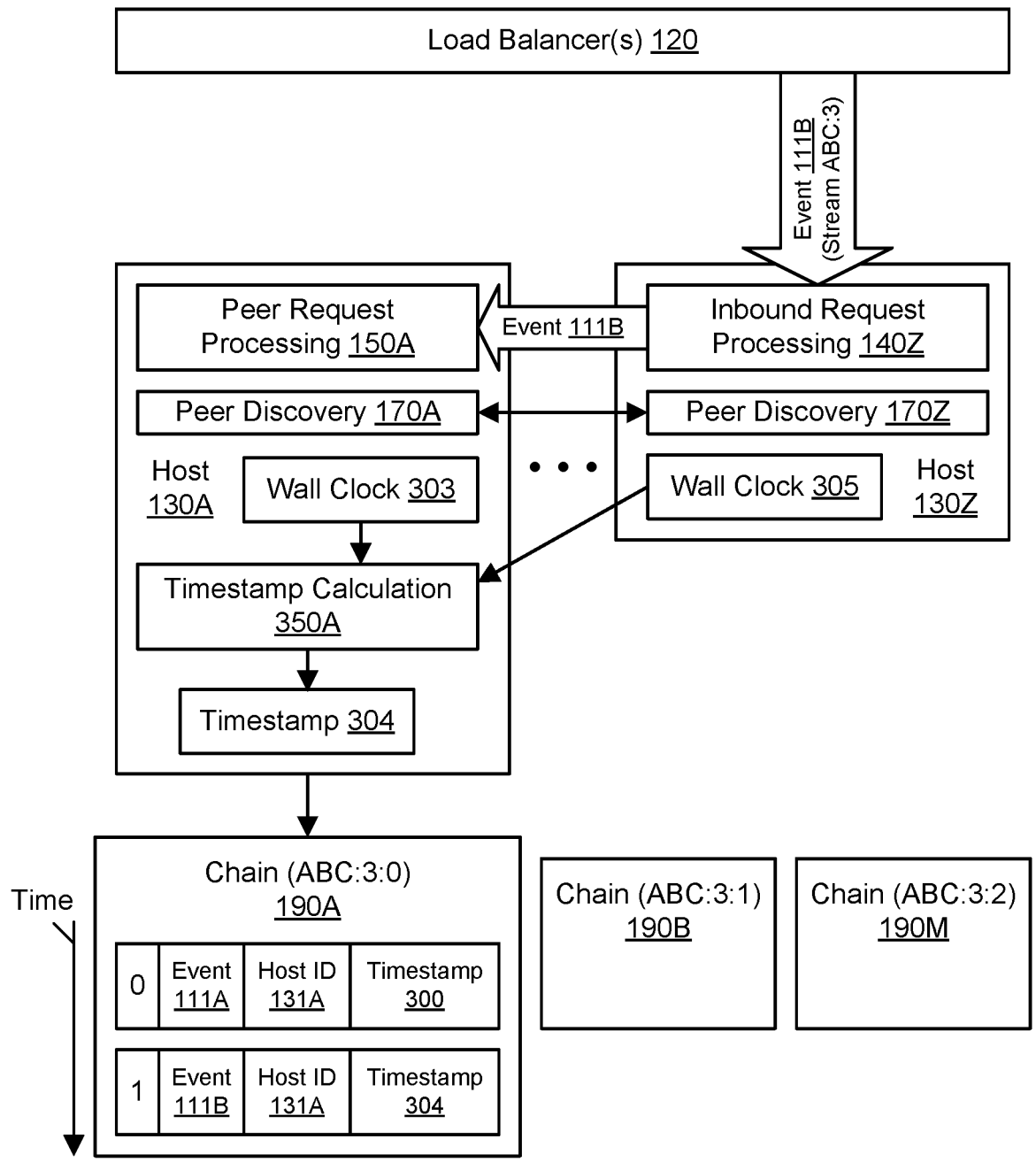

FIG. 3C continues the example of FIG. 3B at a later point in time. In particular, FIG. 3C may occur at wall clock time 303 at host 130A and wall clock time 305 at host 130Z. As shown in FIG. 3C, the host 130A may receive a peer request to log an event 111B from another host 130Z. The peer request may indicate the identifier ABC:3:0 of the selected chain 190A. The peer request may be sent along with peer discovery information, such as any hosts known to host 130Z, any chains known to host 130Z, the ownership status of the chains (if known), the health and performance of the hosts (if known), and the current wall clock time 305 at host 130Z.

The host 130A may append the event 111B to the chain 190A along with a sequence number (one) and the host's ID 131A. In one embodiment, the host 130A may also log the event 111B with a timestamp indicating the relative position of the event in a global ordering across all the chains of the stream. Using the timestamp calculation 350A, the host 130A may calculate an appropriate timestamp 304 for the event 111B. In one embodiment, the timestamp 304 may be calculated as a mean of the wall clock time 303 at host 130A and the wall clock time 305 at the host 130Z. The timestamp 304 may be calculated so that is later than the timestamp of any preceding event in the same chain or other chains. In one embodiment, upon successful logging of the event, the host 130A may respond to the other host 130Z (which may then respond to the load balancer, which may then respond to the client) with an acknowledgement of the successful logging and an event identifier that captures the stream, the chain, and the sequence number within the chain (e.g., ABC:3:0:1). The host 130A may also send its own peer discovery information to the host 130Z, along with its wall clock time 303 at the time of logging the event 111B.

Figure 3D:
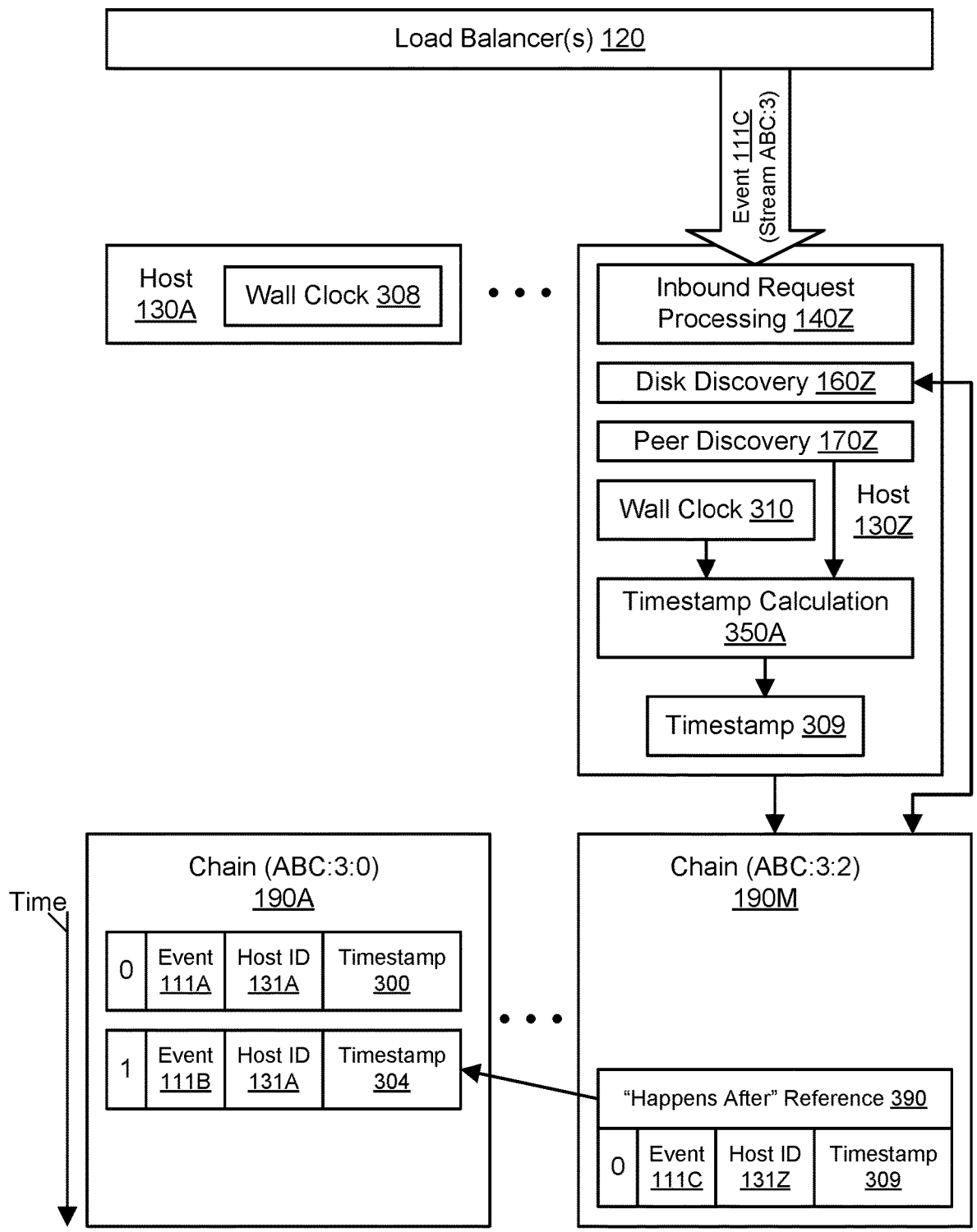

FIG. 3D continues the example of FIG. 3C at a later point in time. In particular, FIG. 3D may occur at wall clock time 308 at host 130A and wall clock time 310 at host 130Z. As shown in FIG. 3D, the host 130Z may receive an inbound request to log an event 111C from the load balancer(s) 120. The event 111C may include or otherwise be associated with a stream identifier ABC:3, where the stream identifier indicates that the stream has three chains. Upon receipt of this request, the host 130Z may select (e.g., at random) one of the chains of the stream for logging the event. For example, the host 130A may select the chain 190M with the identifier ABC:3:2. Using disk discovery 160Z, the host 130Z may examine at least a portion of the chain 190M (e.g., the head of the buffer chain) to determine the status of the chain. As shown in the example of FIG. 3D, the chain 190M is previously unmodified, and so the host 130Z may claim ownership. The host 130Z may append the event 111C to the chain 190M along with a sequence number (zero) and the host's ID 131Z.

In one embodiment, the host 130Z may also log the event 111C with a timestamp indicating the relative position of the event in a global ordering across all the chains of the stream. Using the timestamp calculation 350Z, the host 130Z may calculate an appropriate timestamp 305 for the event 111C. In one embodiment, the timestamp 309 may be determined for the event 111C even though the wall clock time at the host 130Z is 310 based (at least in part) on the host 130Z's knowledge of other wall clocks in the fleet.

In one embodiment, the timestamp 309 may be calculated as a mean of the wall clock time 308 at host 130A and the wall clock time 310 at the host 130Z. The timestamp 309 may be generated so that is later than the timestamp of any preceding event in the same chain or other chains. In one embodiment, upon successful logging of the event, the host 130Z may respond to the load balancer(s) 120 (which may then respond to the client) with an acknowledgement of the successful logging and an event identifier that captures the stream, the chain, and the sequence number within the chain (e.g., ABC:3:2:0). The event identifiers may be alpha-sortable so that a set of events may be placed in a global order by sorting their respective event identifiers.

In one embodiment, the host 130Z may also log the new event 111C with a reference 390 to the earlier event 111B that is known to the host. This reference may represent "happens after" metadata that can be used to reconstruct a global order of events across different chains. The logging system 100 may weave multiple chains of a stream into a global ordering using cross-pollination of wall clock times from different hosts as well as chain times and other metadata (e.g., "happens before" and/or "happens after" references to other events) to determine approximate timestamps for events. The cross-pollination of time data may permit the logging system 100 to determine the global order of events and also construct stable wall clock approximations that do not suffer from clock skew at individual hosts. Using the techniques described herein, a stream may represent a complete log of changes with a global ordering that can be derived from data logged with events across different chains of a stream. Due to the construction of a global order across different chains, a stream can be searched forward or backward from a point in time or a particular event.

Figure 4A:
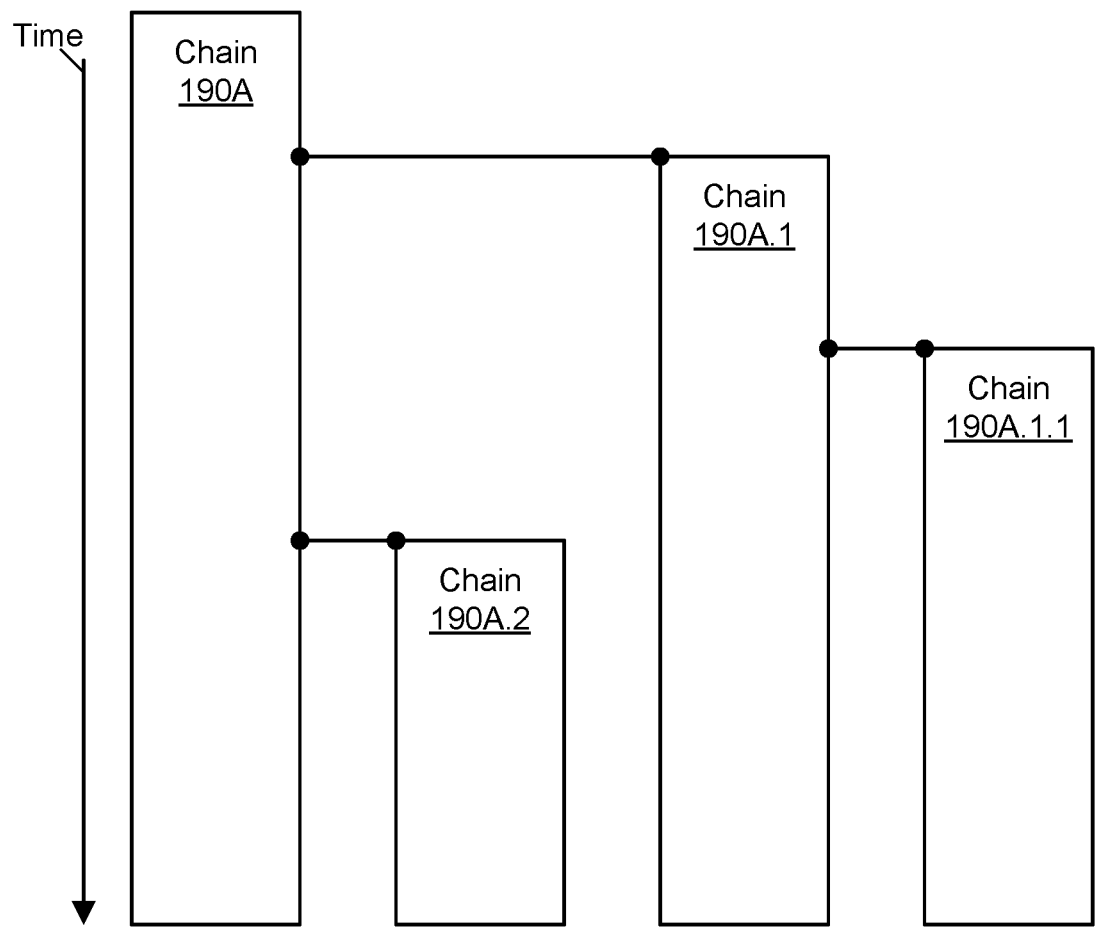
FIG. 4A through FIG. 4C illustrate examples of growing and shrinking chains in a stream, according to some embodiments.
Figure 4B:
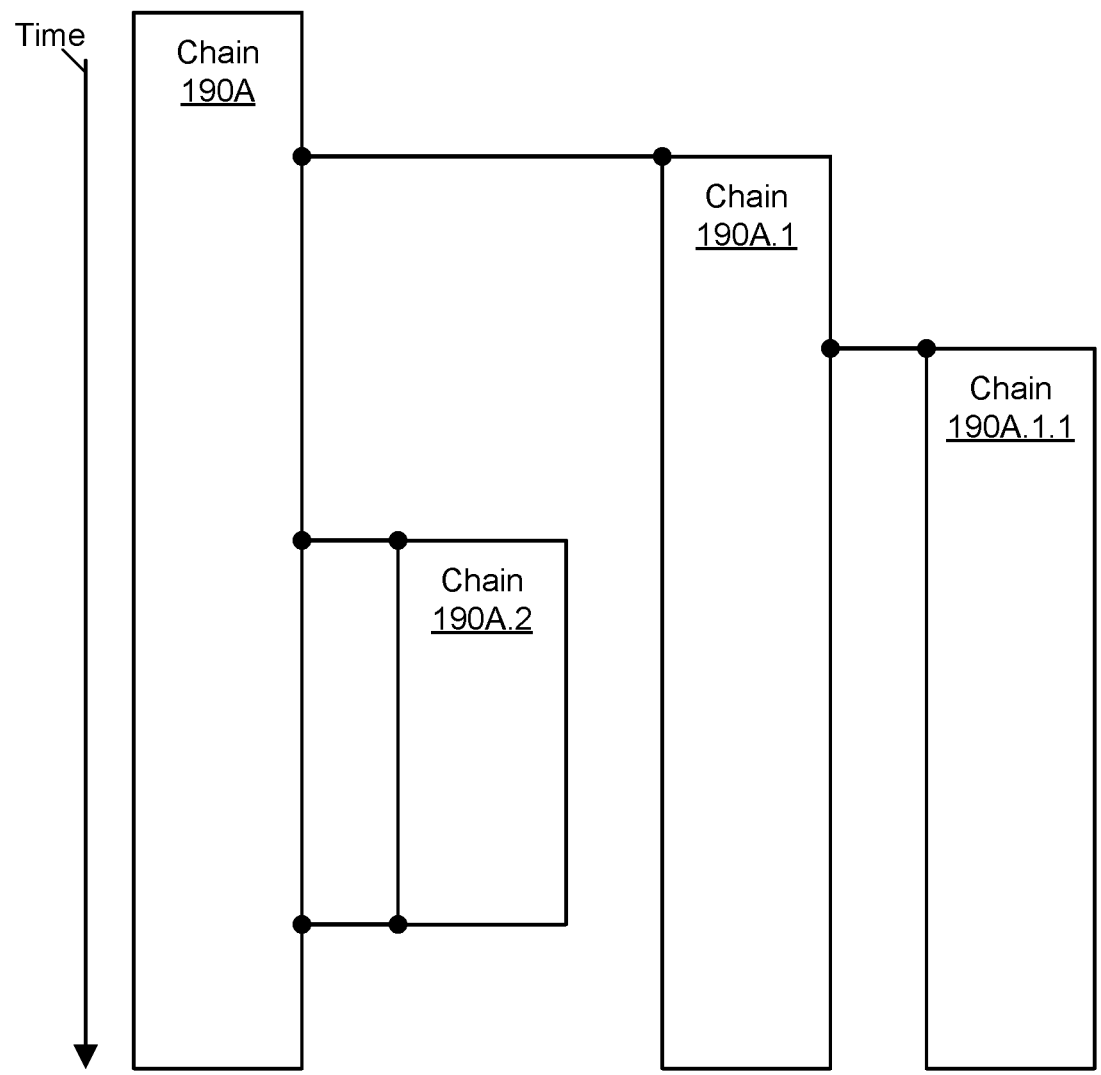
Figure 4C:
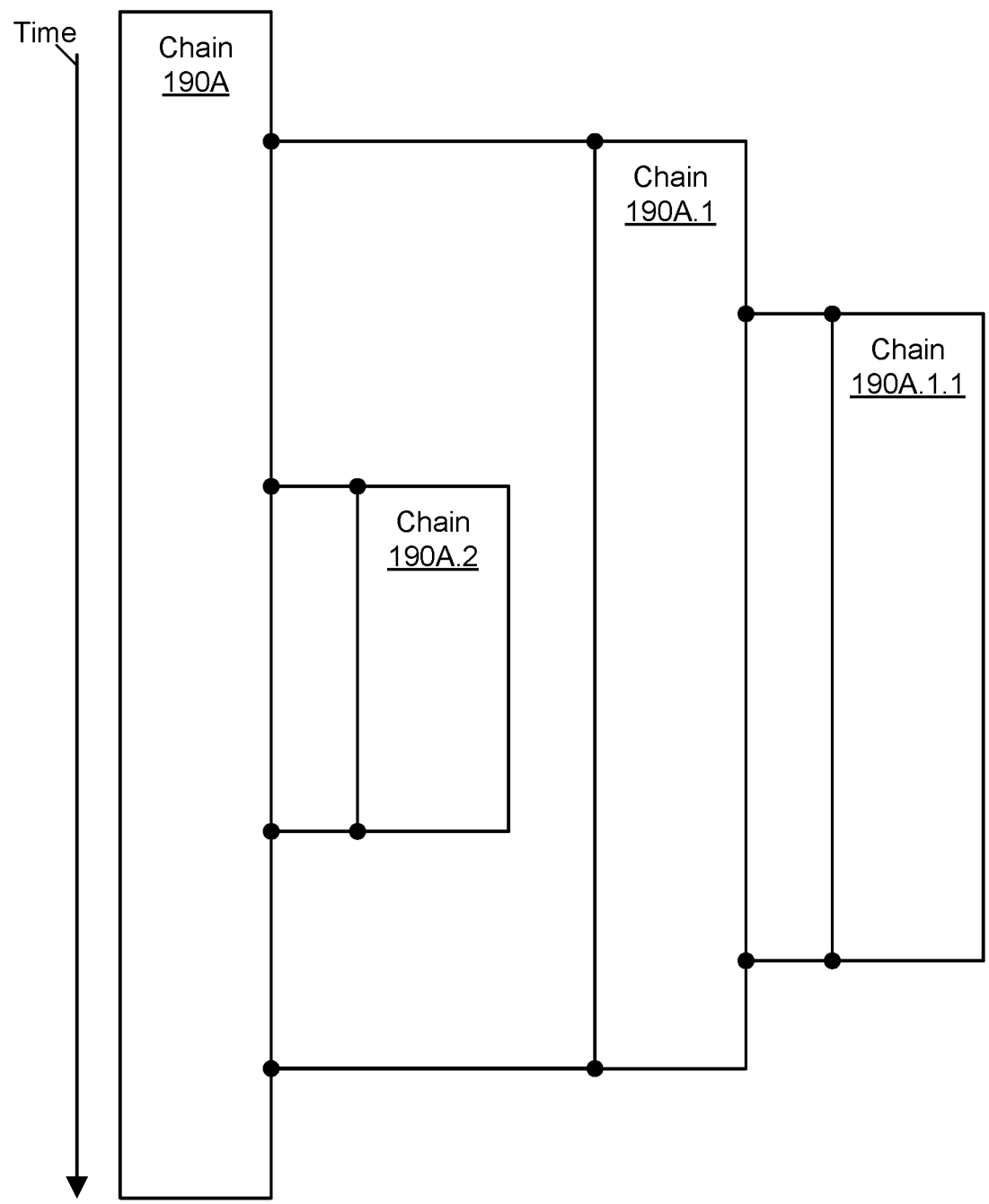

FIG. 4A through FIG. 4C illustrate examples of growing and shrinking chains in a stream, according to some embodiments. To distribute heat across the logging system 100, multiple chains may be employed in a stream. The volume of events may grow to a large enough number that additional chains may be spawned to maintain high availability and low latency. Excessively high or low volume to a chain may be detected by generally restricting chain updates to be performed by a single host. The number of chains in a stream may grow or shrink dynamically based (at least in part) on metrics such as an append rate of events to one or more chains of the stream, a latency of append operations, and so on.

As shown in the example of FIG. 4A, a child chain 190A.1 may be spawned from a root chain 190A. At a later point in time, a child chain 190A.1.1 may be spawned from the child chain 190A.1 (representing the parent of the new child chain). At an even later point in time, another child chain 190A.2 may be spawned from the root chain 190A. To spawn a new chain, an entry into the parent chain may be logged with the chain identifier of the child chain. The child may continue to exist until its death is recorded in the child itself. During its life, the parent may include the child reference continuously in all updates, e.g., as indicated by hosts exchanging peer discovery information for the parent chain. Thus hosts in the logging system 100 may deterministically know the identities of all chains in a stream at any given point in time. By permitting events to be logged to multiple chains of the same stream in a manner that permits a global order of events to be determined, the logging system may offer high availability as well as efficient use of computational and storage resources.

FIG. 4B may represent a continuation of FIG. 4A at a later point in time. As shown in the example of FIG. 4B, the child chain 190A.2 may be closed, and the closing may be recorded in the parent chain 190A. The parent chain 190A may no longer log the existence of the child chain 190A.2 in subsequent events occurring after the closing of the child chain. At this point in time, the other child chains 190A.1 and 190A.1.1 may continue to accept new events.

FIG. 4C may represent a continuation of FIG. 4B at a later point in time. As shown in the example of FIG. 4C, the child chain 190A.1.1 may be closed, and the closing may be recorded in its parent chain 190A.1. The parent chain 190A.1 may no longer log the existence of the child chain 190A.1.1 in subsequent events occurring after the closing of the child chain. Additionally, the child chain 190A.1 may be closed, and the closing may be recorded in its parent chain 190A. The parent chain 190A may no longer log the existence of the child chain 190A.1 in subsequent events occurring after the closing of the child chain. In one embodiment, the chain 190A.1 may not be closed until all of its children (chain 190A.1.1) have been closed.

Chain Logging Using Key-Value Data Storage

Various embodiments of methods and systems for implementing chain logging using key-value data storage are described. A chain, also referred to herein as a buffer chain, may represent a highly available, low latency, and durable log for events produced by multiple event producers. The log may be appended to at the head, iterated in either direction, and truncated at the tail. A chain may include a head and an additional set of nodes. The head and the nodes may be stored in a persistent key-value data store. New events are first added to the head and can eventually be offloaded in new nodes. To prevent the same event from being logged twice, events may be associated with event IDs that are checked before logging can occur. Multiple entities can concurrently access the chain, e.g., to add new events. In this manner, a highly available and durable logging system may be provided for clients.

Figure 5A:
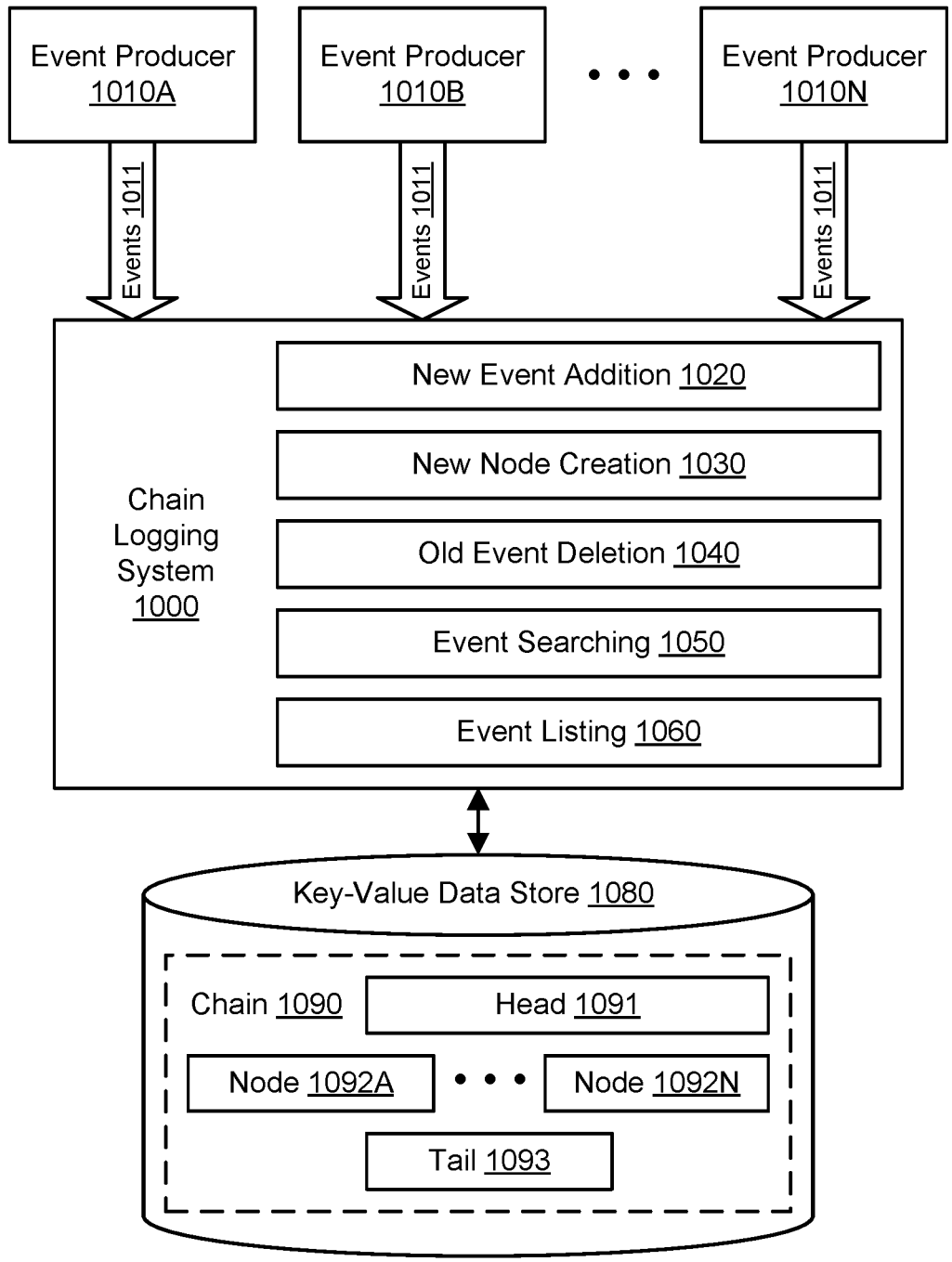
FIG. 5A illustrates an example system environment for chain logging using key-value data storage, according to some embodiments.

FIG. 5A illustrates an example system environment for chain logging using key-value data storage, according to one embodiment. A chain logging system 1000 may capture data indicative of events 1011 in a particular order in a chain 1090. The chain 1090 may represent any of chains 190A to 190M. The data indicative of events 1011 may also be referred to simply as events, and a log entry representing an event may be referred to as an element of the chain. Events 1011 may be analogous to events 111. Events 1011 may represent transactions, status changes, status reports, and/or other updates with respect to one or more systems, data sets, data stores, and/or any other suitable items. For example, the events 1011 may relate to financial transactions, orders in a marketplace, accounting transactions, updates to gift card balances, and so on. The events 1011 may be generated and provided to the logging system 1000 by a plurality of event producers 1010A-1010N. Event producers 1010A-1010N may be analogous to event producers 110A-110N.

Although three event producers 1010A, 1010B, and 1010N are shown for purposes of illustration and example, it is contemplated that any suitable number and configuration of event producers may be used to feed events to the logging system 1000. The event producers 1010A-1010N and other clients of the logging system 1000 may represent different processes, systems, and/or computing devices. The event producers 1010A-1010N and other clients of the logging system 1000 may be distributed on multiple computing devices throughout one or more networks, including private networks and/or public networks such as the Internet. The event producers 1010A-1010N and other clients of the logging system 1000 may also be coupled to the logging system 1000 through one or more networks, including private networks and/or public networks such as the Internet. As will be discussed in greater detail below, the event producers 1010A-1010N and other clients of the logging system 1000 may interact with the logging system 1000 using one or more suitable interfaces, such as one or more application programming interfaces, e.g., to invoke the functionality of the logging system.

A key-value data store 1080 may store key-value pairs using any suitable storage technology. The key-value data store 1080 may implement the data store 180. The keys may represent identifiers of portions of the chain 1090, and the corresponding values may represent the contents of those portions (including elements that represent events). In one embodiment, the key-value data store 1080 may represent a distributed hash table (DHT). To store key-value pairs, the DHT may be implemented as a decentralized system that offers a lookup service similar to a hash table. In on embodiment, any participating node of the DHT may efficiently retrieve the value associated with a given key. The DHT may scale to very large numbers of nodes and may be capable of handling node arrivals, node departures, and node failures. In one embodiment, the key-value data store 1080 supports operations such as conditional put, conditional delete, and get in order to interact with the logging system 1000.

The chain 1090 may capture various sequences of the events 1011 in respective portions of the chain. In one embodiment, the chain 1090 may include a head 1091 and a plurality of nodes 1092A-1092N. Although the nodes 1092A-1092N are shown for purposes of illustration and example, it is contemplated that any suitable number and configuration of nodes (from zero for a relatively new chain to a large number for a more mature chain) may be part of a particular chain. The chain 1090 may also include a tail 1093 that indicates a point at which older elements in the chain have been deleted and/or marked for deletion. The nodes 1092A-1092N may be arranged in a particular order, such as a chronological order. In one embodiment, the chronological order may be based (at least in part) on the different times at which new events are received by the logging system 1000 and added to the head 1091 of the chain 1090. Elements may be added to the head of the chain in a first-in, first-out manner. The head 1091 may typically store newer elements before those elements are offloaded to the nodes 1092A-1092N. The nodes 1092A-1092N may typically store older elements that have been offloaded from the head 1091. In this manner, the logging system 1000 may limit the addition of new elements to the head 1091. In one embodiment, elements may be deleted only from the oldest and least recent end of the chain 1090, e.g., among one or more contiguous nodes containing elements previously offloaded from the head 1091. In this manner, the logging system 1000 may limit mutation of the chain 1090 to either end and prevent alterations to the middle of the chain. The chain 1090 is shown for purposes of illustration and example. The logging system 1000 may maintain many chains other than the chain 1090 illustrated in FIG. 5A. The other chains may be maintained in the same data store 1080 or in other data stores of the same type or of a different type.

The head 1091, nodes 1092A-1092N, and tail 1093 for the particular chain 1090 may be stored persistently in the key-value data store 1080. For example, in the data store 1080, the key for the head 1091 may be based (at least in part) on (e.g., as a hash of) a chain identifier for the chain 1090. The chain identifier (or chain ID) may be considered unique to the particular chain 1090, at least in some context relevant to the logging system 1000. The keys for the nodes 1092A-1092N may also be based (at least in part) on (e.g., as a hash of) a chain identifier for the chain 1090, but the keys for the nodes may also be based (at least in part) on (e.g., as a hash of) an indicator of a position in the order of the chain. For example, if the chain identifier is "chain1," the identifier of the head 1091 in the chain 1090 may include the string "chain1:head," and the key for the head in the data store 1080 may include that string or may be derived from that string (e.g., as a hash of the string).

Similarly, the key for a node may be based (at least in part) on the chain identifier and an indicator of the node's position in the sequence such as a node index. For the chain identifier "chain1," the identifier of the oldest node in the chain order (e.g., node 1092A) may include the string "chain1:0," the identifier of the second oldest node in the chain order may include the string "chain1:1," the identifier of the third oldest node in the chain order may include the string "chain1:2," and so on. In the key-value data store 1080, the keys for the nodes may include those strings or may be derived from those strings (e.g., as a hash of the string). For the chain identifier "chain1," the identifier of the tail 1093 in the chain may include the string "chain1:tail," and the key for the tail in the data store 1080 may include that string or may be derived from that string (e.g., as a hash of the string). Accordingly, the keys for the nodes 1092A-1092N in the key-value data store 1080 may indicate the relative positions of the nodes in a particular order (e.g., a chronological order) that is captured in the chain 1090. In one embodiment, a node may be keyed by the chain identifier and additional information that indicates the node's position in the sequence such as a combination of the sequence contents, position, and sequence index.

Any of the nodes 1092A-1092N may be retrieved from the data store 1080 independently of any other node, given knowledge of the chain identifier and the node index (or other indicator of the node's position in the sequence). In one embodiment, the keys for the head 1091, nodes 1092A-1092N, and/or tail 1093 may also include or be derived from (e.g., as a hash of) an identifier of a client who "owns" the chain and potentially one or more other values. For example, the key for the head 1091 may include or be derived from the string "clientname1:chain1:head" or the string "clientname1:projectname1:chain1: head."

The logging system 1000 may include various components or functionalities. In one embodiment, the logging system 1000 may include a component for new event addition 1020. In one embodiment, the logging system 1000 may include a component for new node creation 1030. In one embodiment, the logging system 1000 may include a component for old event deletion 1040. In one embodiment, the logging system 1000 may include a component for event searching or seeking 1050. In one embodiment, the logging system 1000 may include a component for event listing 1060.

It is contemplated that the logging system 1000 may include additional components not shown, fewer components than shown, or different combinations, configurations, or quantities of the components shown. The logging system 1000 may comprise one or more computing devices, any of which may be implemented by the example computing device 3000 illustrated in FIG. 11. In various embodiments, portions of the logging system 1000 may be provided by the same computing device or by any suitable number of different computing devices. If any of the components of the logging system 1000 are implemented using different computing devices, then the components and their respective computing devices may be communicatively coupled, e.g., via a network. Each of the illustrated components may represent any combination of software and hardware usable to perform their respective functions.

In one embodiment, the functionality of the logging system 1000 may be provided to event producers 1010A-1010N and other clients as a web-accessible service. The functionality of the logging system 1000 may be presented to clients using a provider network. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

Figure 5B:
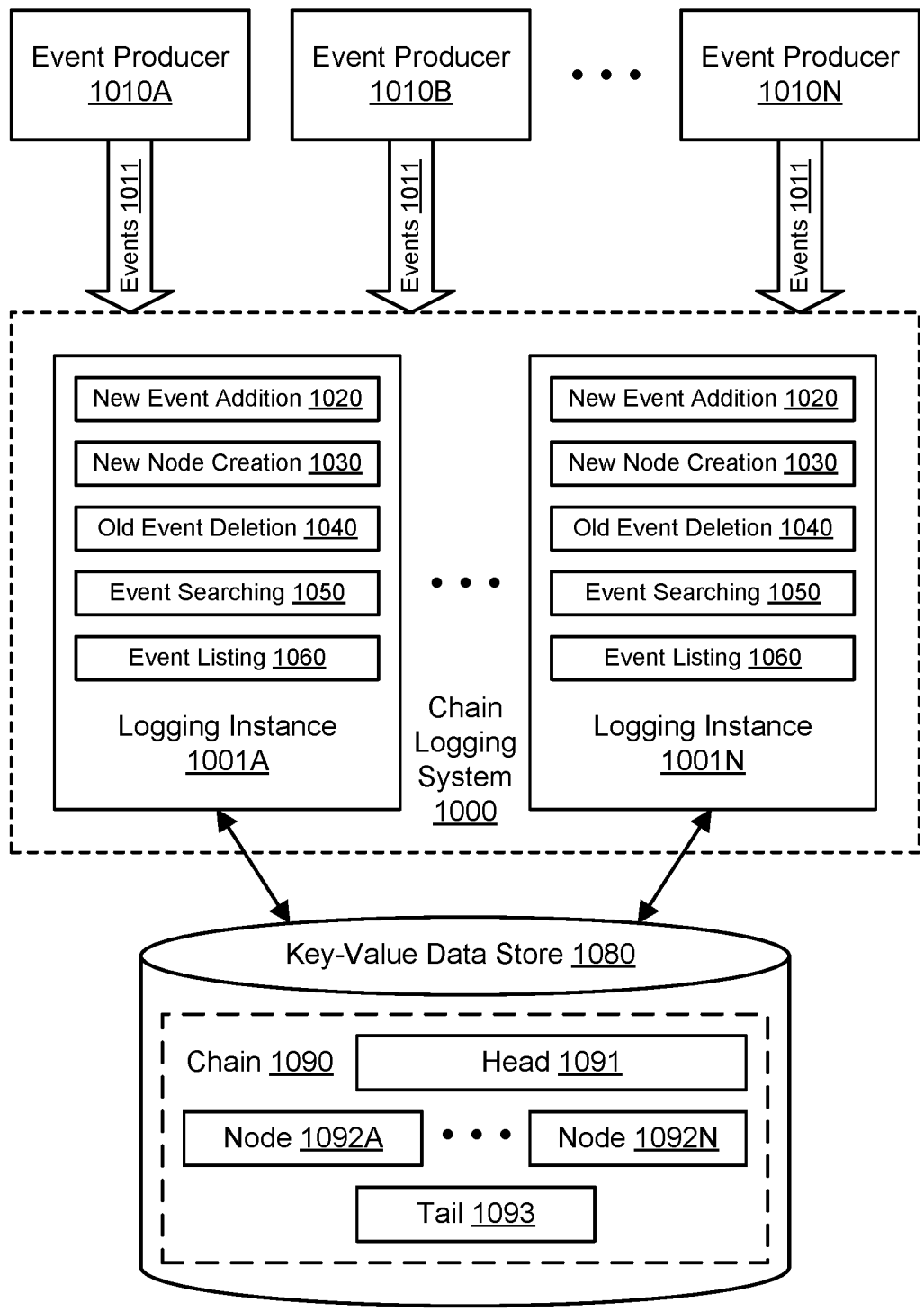
FIG. 5B and FIG. 5C illustrate an example system environment for chain logging using key-value data storage, including a distributed set of logging instances, according to some embodiments.
Figure 5C:
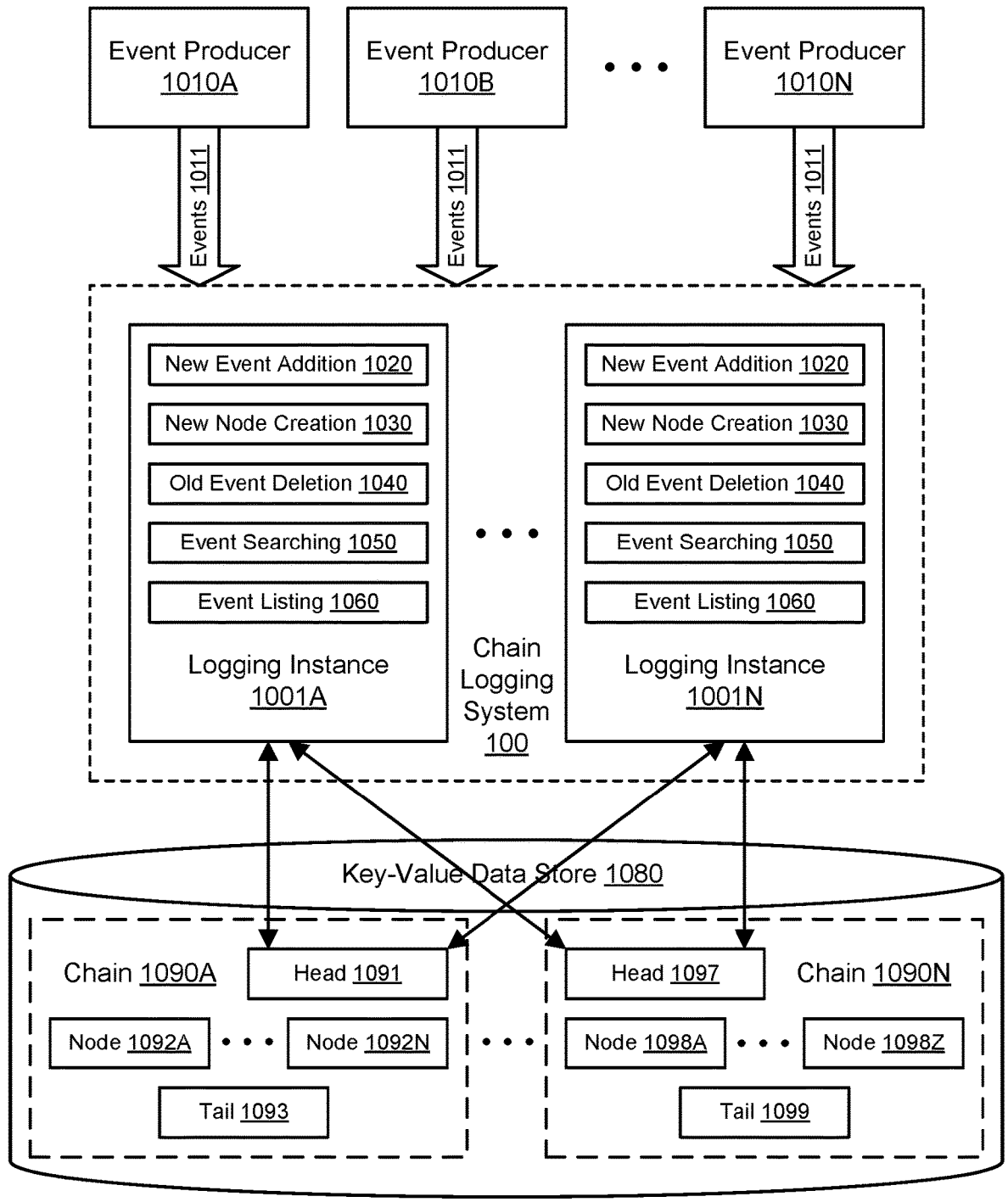

In various embodiments, the functionality of the logging system 1000 may be centralized or distributed. For a more centralized system, a load balancer (or fleet of load balancers) may be used to receive logging requests from event producers and other clients and forward those requests to individual logging hosts in a fleet. FIG. 5B and FIG. 5C illustrate an example system environment for chain logging using key-value data storage, including a distributed set of logging instances, according to one embodiment. The functionality of the logging system 1000 may be distributed as a plurality of logging instances such as instances 1001A through 1001N. The logging instances 1001A-1001N may be analogous to the logging hosts 130A-130Z. Although two logging instances 1001A and 1001N are shown for purposes of illustration and example, it is contemplated that any suitable number and configuration of logging instances may be used to implement the logging system 1000. The logging instances 1001A-1001N may represent different hosts. The logging instances 1001A-1001N may be distributed on multiple computing devices throughout one or more networks, including private networks and/or public networks such as the Internet. In one embodiment, at least some of the functionality of the logging system 1000 may be implemented as a library of functions, and the logging instances 1001A-1001N may represent implementations of the library. For example, the event producers 1010A-1010N may represent programs that include the library in their program code. Using the distributed logging system 1000 as implemented using the logging instances 1001A-1001N, multiple entities may access the chain 1090 concurrently, e.g., to read elements from the chain, delete elements from the chain, iterate through the chain, search in the chain, and so on. The distributed nature of the logging system 1000 as shown in FIG. 5B may enable many logging instances to read a large chain more quickly than a single logging instance could perform the same task.

In some embodiments, a plurality of entities within the logging system 1000 may access a plurality of chains concurrently, e.g., to read elements from the chains, delete elements from the chains, iterate through the chains, search in the chains, and so on. As shown in the example of FIG. 5C, a plurality of logging instances 1001A-1001N may access a plurality of chains. The chains may include any suitable number of chains from chain 1090A to chain 1090N. As discussed above with respect to chain 1090A, chain 1090N may also include a head 1097, a set of nodes 1098A-1098Z, and a tail 1099. The set of nodes 1098A-1098Z may vary in number from the nodes 1092A-1092N in the other chain 1090A. The example of FIG. 5C illustrates the logging instance 1001A accessing (or attempting to access) the heads of two chains 1090A and 1090N (e.g., to add elements) while the logging instance 1001N is also accessing (or attempting to access) the heads of the two chains 1090A and 1090N (e.g., to add elements). Because updates to the heads 1091 and 1097 in the data store 1080 may be performed with conditional put operations, some updates may fail and require a head to be reloaded by an instance while multiple logging instances are attempting to update the same head over a small window of time. In one embodiment, locks on a head need not be acquired due to the use of a conditional put for head updates. In this manner, the logging system 1000 may permit many-to-many relationships between logging instances 1001A-1001N and chains 1090A-1090N.

Using the component for new event addition 1020, a request from an event producer may be processed by the logging system 1000 to add a new event (e.g., data indicative of the event) to the head 1091 of the chain 1090. The request may represent a request to push, append, or add one or more elements to the chain. In one embodiment, new events may be added only to the head 1091 first before potentially being offloaded to individual ones of the nodes 1092A-1092N. In one embodiment, suitable access credentials may be required before a request to add an element is processed.

Using the component for new node creation 1030, a new node may be automatically created and stored in the data store 1080. The new node may include a sequence of one or more elements previously added to the head 1091. Once offloaded to the new node, the sequence of elements may be deleted from the head at any suitable time. The new node may be associated with a node index that indicates the position of the node in a sequential order of events. A key for the new node in the data store 1080 may include or be derived from the chain identifier of the chain 1090 and the node index.

Using the component for old event deletion 1040, a request from a client of the logging system 1000 may be processed by the logging system to remove one or more of the oldest events event (e.g., data indicative of the event) from the nodes 1092A-1092N of the chain 1090. The request may represent a request to pop, truncate, remove, or delete one or more elements from the chain. In one embodiment, elements may be removed only from the oldest end of the chain, e.g., in one or more nodes that were created the furthest back in time. In one embodiment, elements may be removed only from one or more nodes having the lowest node index or indices. In one embodiment, one or more older elements may be removed from an oldest remaining node while one or more newer elements may remain in the node. The tail 1093 may be used to track which elements have been marked for logical deletion and which elements have actually been physically deleted, e.g., from the data store 1080. In one embodiment, suitable access credentials may be required before a deletion request is processed.

Using the event searching or seeking 1050, a request from a client of the logging system 1000 may be processed by the logging system to search over the chain 1090. In one embodiment, the search may represent a k-ary search that divides the nodes 1092A-1092N into k+1 segments of roughly equal size and returns k nodes on the borders of those segments. For example, for a binary search (e.g., based on an input value k=1 or a default search), the nodes 1092A-1092N may be divided into two segments of roughly equal size, and the search may return a single node in the middle of the chain. In one embodiment, suitable access credentials may be required before a search request is processed.

Using the component for event listing 1060, a request from a client of the logging system 1000 may be processed by the logging system to list a contiguous sequence within the chain 1090. In one embodiment, the list operation may list elements from nodes (and potentially from the head) either forwards or backwards in order. The individual nodes may be retrieved from the data store 1080 based on the chain identifier and the node indices, e.g., when the keys for the nodes include or are derived from a combination of the chain identifier and the node indices. In one embodiment, suitable access credentials may be required before a list request is processed.

The logging system 1000 may perform mutating operations (e.g., addition and deletion) in a first-in, first-out manner. The logging system 1000 may perform read operations using random access and/or sequential access. The logging system 1000 may be especially useful for maintaining logs in many types of domains, including financial transaction logs, job processing logs, event stream logs, and so on. The logging system 1000 and logging instances 1001A-1001N may represent stateless components with persistence managed by the data store 1080. In one embodiment, the logging instances 1001A-1001N may not coordinate with one another. For a single chain, the availability for the logging system 1000 as a whole may be equivalent to the availability of a single file (representing the head of a chain) in the data store 1080. For many chains, the availability for the logging system 1000 as a whole may be equivalent to the availability of the underlying data store 1080. For stateful clients (e.g., clients that can pass in the result of the last put to a chain), the latency of the logging system 1000 may be equivalent to a single conditional put to the data store. By storing the elements in multiple records, the logging system 1000 may scale to chains of an indefinitely large size if the underlying data store 1080 permits. By storing nodes with a sequential numbering scheme, random access of nodes may be performed without a need to link from node to node or without a need to keep the nodes linked within the head or otherwise synchronized with the head.

The durability of the logging system 1000 may be derived from that of the key-value data store 1080. Because nodes can be named sequentially based on node indices, loss of part of the chain may not corrupt the rest of the chain. Optional mirroring of data in k nodes may be implemented so that a loss of k−1 nodes may not result in data loss. To implement mirroring, extra sequences may be retained in the head and in each node as the sequences are offloaded. The internal nodes may continue to be keyed on the sequence index of the highest sequence they contain. To page over the contents, every k nodes may be loaded instead of each sequential node. The availability of the data as well as the durability and cost for read operations maybe increased by a factor of k. The optional mirroring may retain the convenience of correctness, complexity, and consistency maintained internally within the chain.

Figure 6:
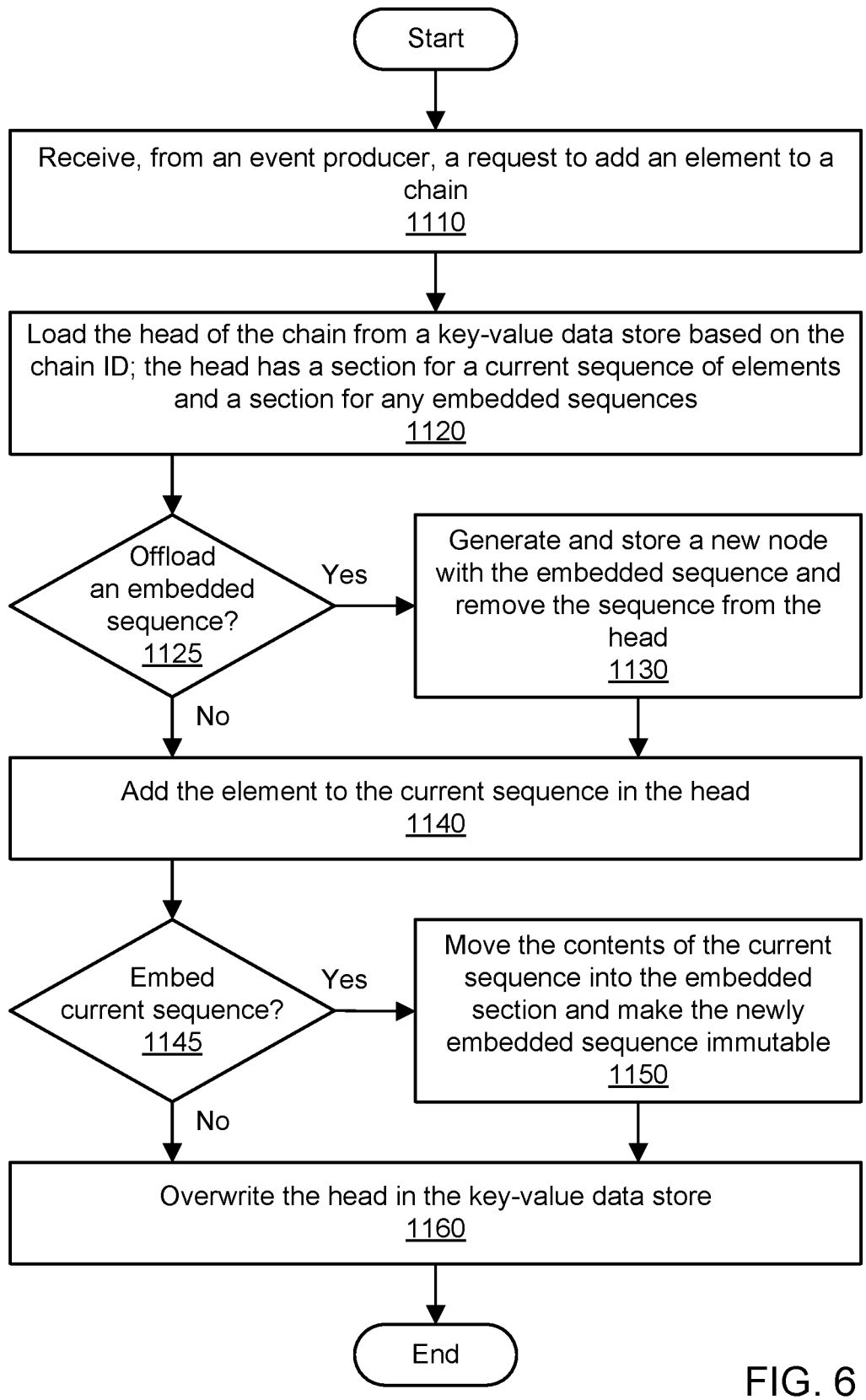
FIG. 6 is a flowchart illustrating a method for adding an element to the head of a chain, according to some embodiments.

FIG. 6 is a flowchart illustrating a method for adding an element to the head of a chain, according to one embodiment. At least some of the operations shown in FIG. 6 may be performed by a logging system. As shown in 1110, a request to add an element to a chain may be received, e.g., from an event producer that is a client of the logging system. The element may correspond to an event in a stream of events. The element may represent a transaction, status change, status report, and/or other update with respect to one or more systems, data sets, data stores, and/or any other suitable items. For example, the element may correspond to and/or describe a financial transaction, an order in a marketplace, an accounting transaction, an update to a gift card balance, and so on. The request to add the element may indicate a chain identifier and the contents of the element.

As shown in 1120, the head of the chain may be loaded from a key-value data store. The key by which the head is retrieved may include or be derived from (e.g., as a hash of) the chain identifier supplied in the request. In one embodiment, the key for the head may also include or be derived from an identifier of the client that sent the request and that has access privileges to add to the chain. If the head is not found in the data store, then the head may be created. The head may include a current section and an embedded section. Either section may be populated or may be empty when the head is loaded. The current section may include a sequence of one or more earlier events that were previously added to the head. The embedded section may include one or more even earlier sequences that were previously added to the head, and each of the embedded sequences may include one or more events. Sequences in the embedded section may be considered immutable and ready to be offloaded to the nodes that represent the body of the chain. Each element may be associated with an element index that indicates the relative position of the element in an order, e.g., the order in which new events are received by the logging system and added to the head of the chain. Each sequence in the embedded section may be associated with a sequence index that indicates the relative position of the sequence in an order, e.g., the order in which new sequences are moved or "graduated" to the embedded section in the head of the chain.

As shown in 1125, it may be determined whether any embedded sequence(s) in the head should be offloaded to their own nodes. Offloading refers to the process of moving one or more elements from the head to a node of the chain. The determination to offload an embedded sequence from the embedded section to its own node may be based on any suitable factors. In one embodiment, any embedded nodes may be offloaded at the next push operation rather than proactively offloaded at the time of embedding. In one embodiment, an embedded sequence may be offloaded when the embedded section has passed a predetermined size threshold. In one embodiment, an embedded sequence may be offloaded when a predetermined duration of time has passed since the embedded sequence was added to the embedded section. In one embodiment, an embedded sequence may be offloaded when a predetermined number of sequences have been added to the embedded section.

If so, then as shown in 1130, for each embedded sequence that is to be offloaded, a new node may be generated that includes the embedded sequence of elements. The new node may be stored in the key-value data store. The embedded sequence may be removed from the head at any suitable time after the new node is successfully stored in the data store, e.g., in any subsequent push of new elements to the head. In the data store, the key for the node may include or be derived from (e.g., as a hash of) the chain identifier and a node index that indicates the relative position of the node in the order of the chain. In one embodiment, the key for the head may also include or be derived from an identifier of the client that sent the request and that has access privileges to add to the chain. The value associated with the key may include the sequence of elements that is offloaded.

As shown in 1140, the element associated with the request may be added to the current sequence in the head. The element may be added in an order with respect to any other elements in the current sequence, e.g., the order in which new events are received by the logging system. The new element may be associated with an element index that indicates the relative position of the element in the order.

As shown in 1145, it may be determined whether the current sequence in the head (if any) should be embedded in the head. The determination to move the sequence from the current section to the embedded section may be based on any suitable factors. In one embodiment, the current sequence may be embedded when it has passed a predetermined size threshold. In one embodiment, the current sequence may be embedded when a predetermined duration of time has passed since the first element in the current sequence was added. In one embodiment, the current sequence may be embedded when a predetermined number of elements have been added to the current sequence. If so, then as shown in 1150, the contents of the current sequence may be moved to the embedded section as an embedded sequence and made immutable; the contents of the current sequence may be removed from the current section once in the embedded section. Once the elements in the sequence are made immutable, their membership and order in the sequence may not be changed. When the sequence is embedded, it may be associated with a node index or other node identifier. The node indices may be numbered sequentially, and the head may keep track of the last index so that the next embedded sequence can be assigned the next number in the sequence. The operations shown in 1125 and 1130 may be performed prior to the operations shown in 1145 and 1150 so that an embedded sequence is persisted in at least one update of the head before being offloaded in another update of the head.

As shown in 1160, the head may be overwritten in the data store with the updated head. The key for the head may remain the same, but the value associated with that key may be changed. The head may be overwritten with a conditional put operation in the data store. The updated head may now include (in the current section) the element associated with the request. If the current sequence prior to the addition of the new element was embedded, then the updated head may reflect that shift from the current section to the embedded section. If any embedded sequence was successfully offloaded, then the updated head may reflect the deletion of that sequence. In this manner, new elements in the chain may be added to the head first before eventually being offloaded to individual nodes.

Figure 7A:
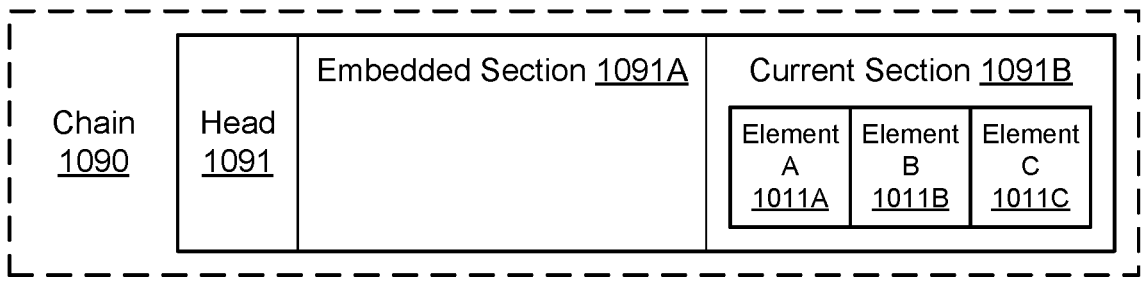
FIG. 7A through FIG. 7E illustrate examples of chains, according to some embodiments.

FIG. 7A through FIG. 7E illustrate examples of chains, according to one embodiment. As shown in the example of FIG. 7A, a chain 1090 may include a head 1091 and no nodes. The head may include an embedded section 1091A and a current section 1091B. The embedded section may be empty. The current section may include three elements, in order from oldest to newest (based, e.g., on the time of receipt by the logging system): element "A" 1011A, element "B" 1011B, and element "C" 1011C.

Figure 7B:
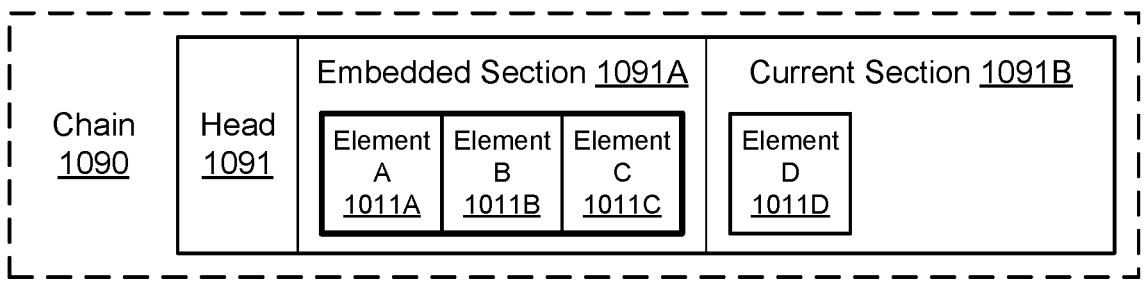

As shown in the example of FIG. 7B, a request may be received to add an element "D" 1011D to the head. As discussed above with respect to FIG. 6, the sequence of elements A, B, and C 1011A-1011C may be moved from the current section to the embedded section and made immutable in terms of the composition and order of the sequence. When the sequence 1011A-1011C is embedded, it may be associated with a node index or other node identifier. The node indices may be numbered sequentially, and the head 1091 may keep track of the last index so that the next embedded sequence can be assigned the next number in the sequence. In one embodiment, embedded sequences and the nodes created from them may vary in their number of elements. In one embodiment, embedded sequences and the nodes created from them may have a fixed number of elements; by enforcing a uniform number of elements per node, searches throughout the body of the chain may be performed by element identifier and not necessarily node identifier. Once the current section has been cleared in this manner, the new element D 1011D may be added to the current section.

Figure 7C:
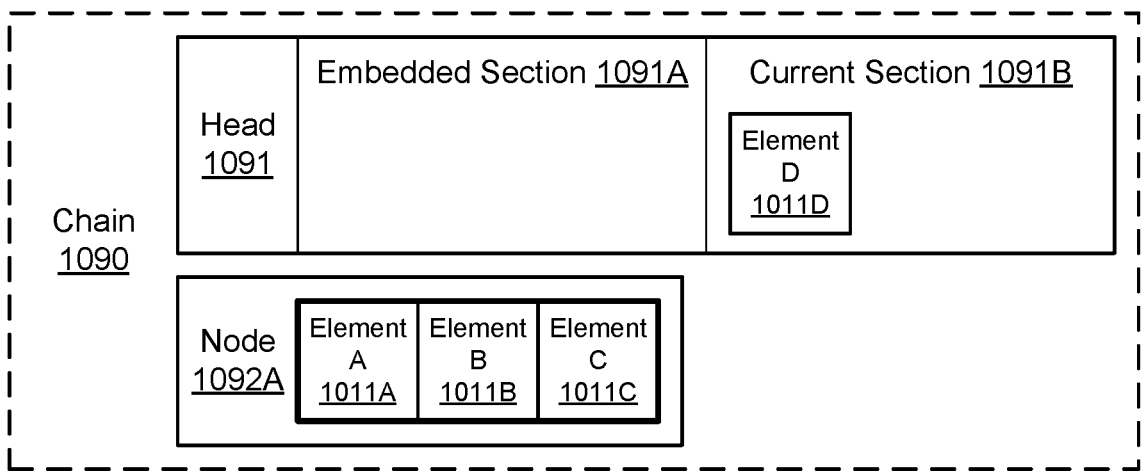

As shown in the example of FIG. 7C, the embedded sequence of elements A, B, and C 1011A-1011C may be offloaded from the head to the node 1092A at some point.

Again, the sequence in the node 1092A may be considered immutable in terms of its composition and order. The node 1092A may be the first created node for this chain and may be associated with a node index of 0 (or otherwise the lowest available index number). The sequence in the node 1092A may be the earliest sequence for this chain and may be associated with a sequence index of 0 (or otherwise the lowest available index number). Each element within the node 1092A may be associated with an element index, e.g., element index 0 for element A, element index 1 for element B, and element index 3 for element C. The comprehensive current state of the chain (e.g., of its contents and order) may be acquired from the head and any nodes currently in the chain: the ordered sequence of elements A-C as found in the earliest (and only) node 1092A and the newest element D as found in the head 1091.

Figure 7D:
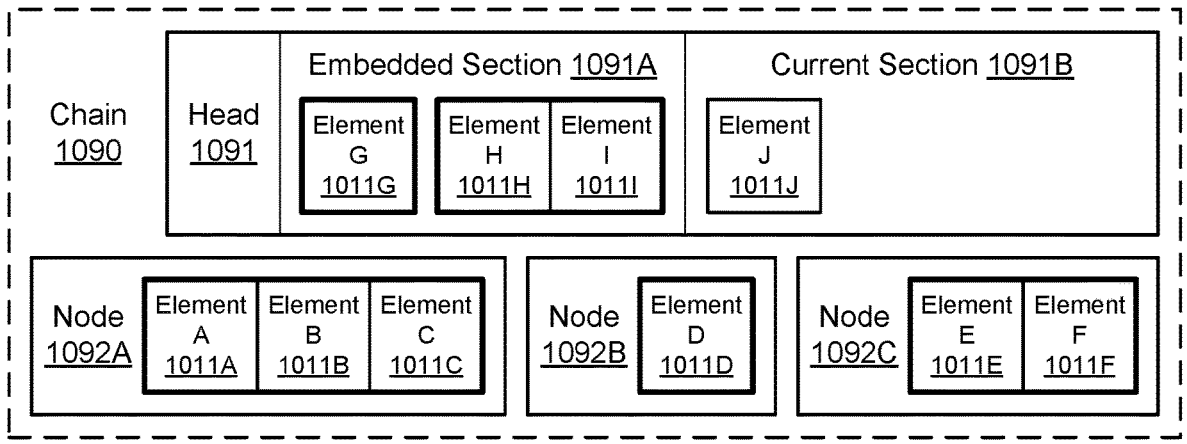

As shown in the example of FIG. 7D, additional elements have been offloaded to individual nodes after first being added to the head as described above. The chain now includes three nodes: the oldest node 1092A as described previously, a second oldest node 1092B containing element D, and a third oldest node 1092C containing a sequence of elements "E" 1011E and "F" 1011F. In addition, the head includes an embedded sequence containing only the element "G" 1011G and a newer embedded sequence containing the elements "H" 1011H and "I" 1011I. The head also includes a current sequence of one element, the newest element "J" 1011J. The two embedded sequences are ready to be offloaded to individual nodes at any suitable time. The comprehensive current state of the contents and order of the chain may be acquired from the head and any nodes currently in the chain, in order from oldest to newest: the ordered sequence of elements A-C as found in the oldest node 1092A, the element D in the second oldest node 1092B, the ordered sequence of elements E and F as found in the third oldest node 1092C, the embedded sequence with element G in the head, the embedded sequence with elements H and I in the head, and the newest element J in the current section of the head. As discussed above, the nodes 1092A-1092C may be stored in the key-value data store 1080 using keys that include or are derived from the chain identifier and the respective node index.

Figure 7E:
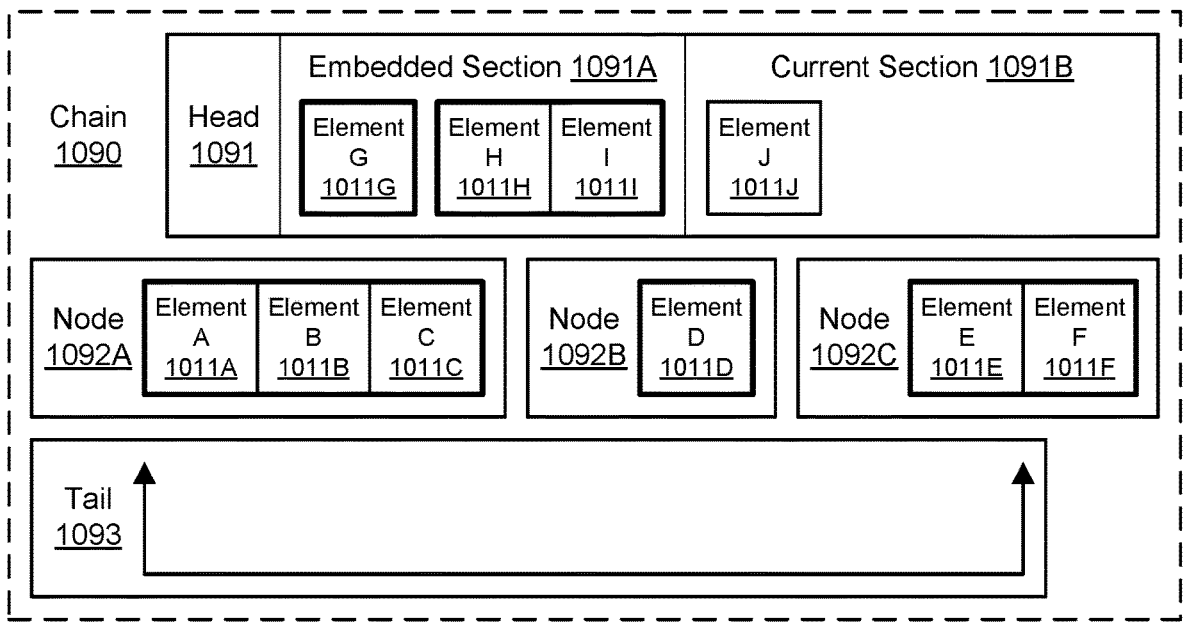

As shown in the example of FIG. 7E, a request has been received to truncate the chain from the oldest end up to a point in the interior of the chain. The request may indicate the chain identifier and the newest element to delete, e.g., element E. The elements up to and including E may be marked for deletion. The tail 1093 may include two references that point to the earliest existing node (before element A in node 1092A) as well as the point up to which we desire to delete (after element E in node 1092C). These two references may span the point of physical deletion to the point of logical deletion in the chain. The tail may permit the tracking of a multi-step delete operation while allowing the logging system to apply an immediate bulk delete by positioning the later logical cursor at the desired position.

Figure 8A:
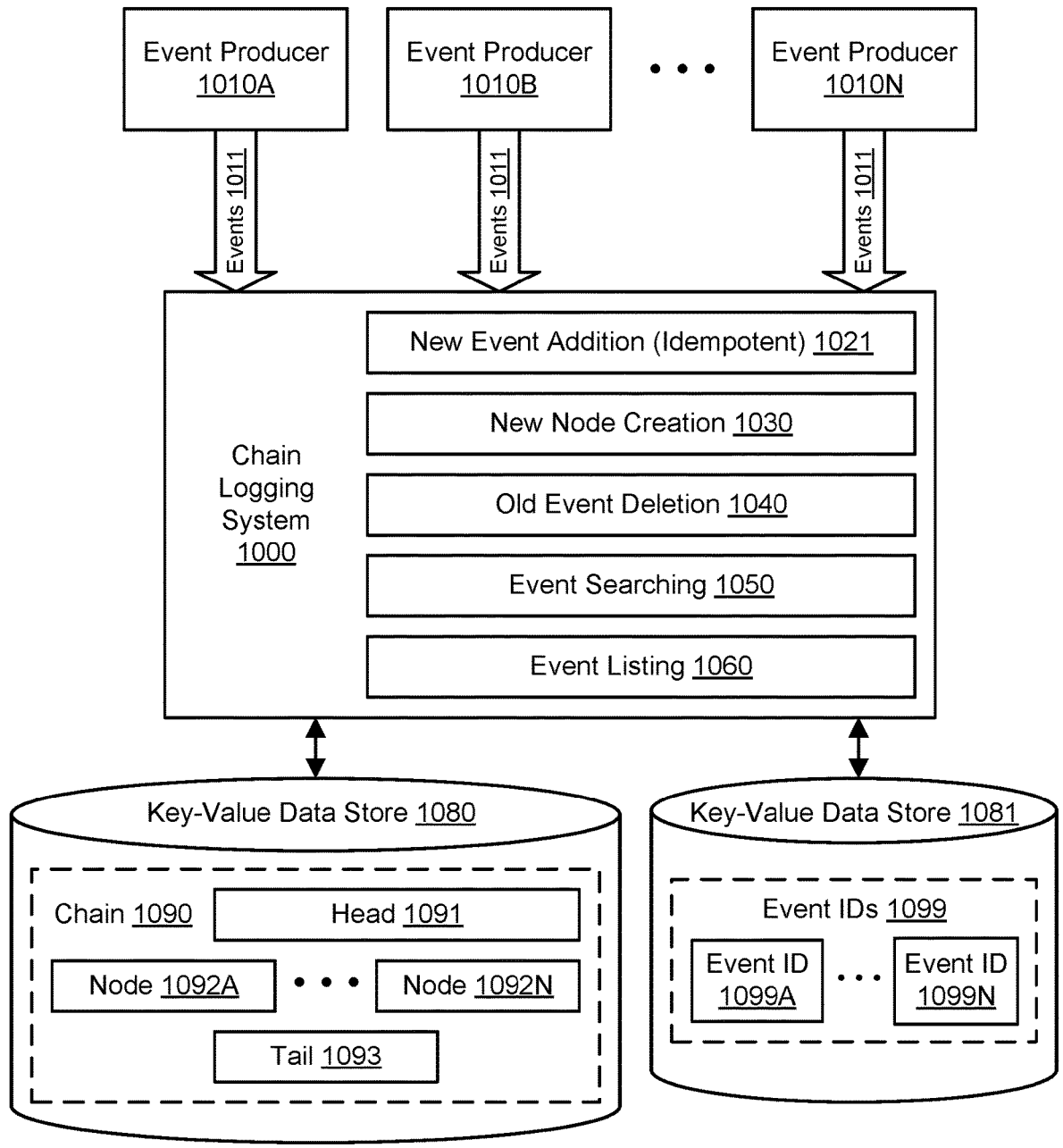
FIG. 8A illustrates further aspects of the example system environment for chain logging using key-value data storage, including an idempotence property for additions to the chain, according to some embodiments.

FIG. 8A illustrates further aspects of the example system environment for chain logging using key-value data storage, including an idempotence property for additions to the chain, according to one embodiment. In one embodiment, the logging system 1000 may include a component for new event addition (with an idempotence property) 1021. When an event is received by the logging system 1000, the event may be supplied with an event identifier by the client, or otherwise the event identifier may be generated. In one embodiment, the event identifier may be determined as a hash of the contents of the event. A set of event identifiers

1099, such as event IDs 1099A-1099N for past events may be stored in a key-value data store 1081. In various embodiments, the data store 1081 may be the same as the data store 1080 used to store the chain or may be a different data store. In the key-value data store 1081, the key for an event identifier may include or be derived from (e.g., as a hash of) the event identifier itself. The value associated with the key may include a pointer or other reference to the event in the chain 1090, e.g., as stored in one of the nodes 1092A-1092N in the data store 1080. In one embodiment, event identifiers for elements still stored in the head 1091 may be retained in the head as well, e.g., in the current section or embedded section along with the corresponding element. In various embodiments, the idempotence property of the addition operation may be enabled or disabled per call (e.g., based on an input value to a push call) or based on a configuration setting.

The event identifiers may be used to implement an idempotence property for requests to add elements to a chain. When a request to add an element is received by the logging system 1000, the new event addition component 1021 may look for the event identifier for the event in the head 1091 and then in the event IDs 1099 in the data store 1081. In one embodiment, the element may be logged to the chain only if its event identifier is not found in the head 1091 or in the event IDs 1099 in the data store 1081. If the event identifier is found in the head 1091 or in the event IDs 1099, the request may be disregarded. In this manner, updates such as financial transactions, accounting transactions, order updates in a marketplace, and withdrawals from gift card balances may be logged only once to a chain.

Figure 8B:
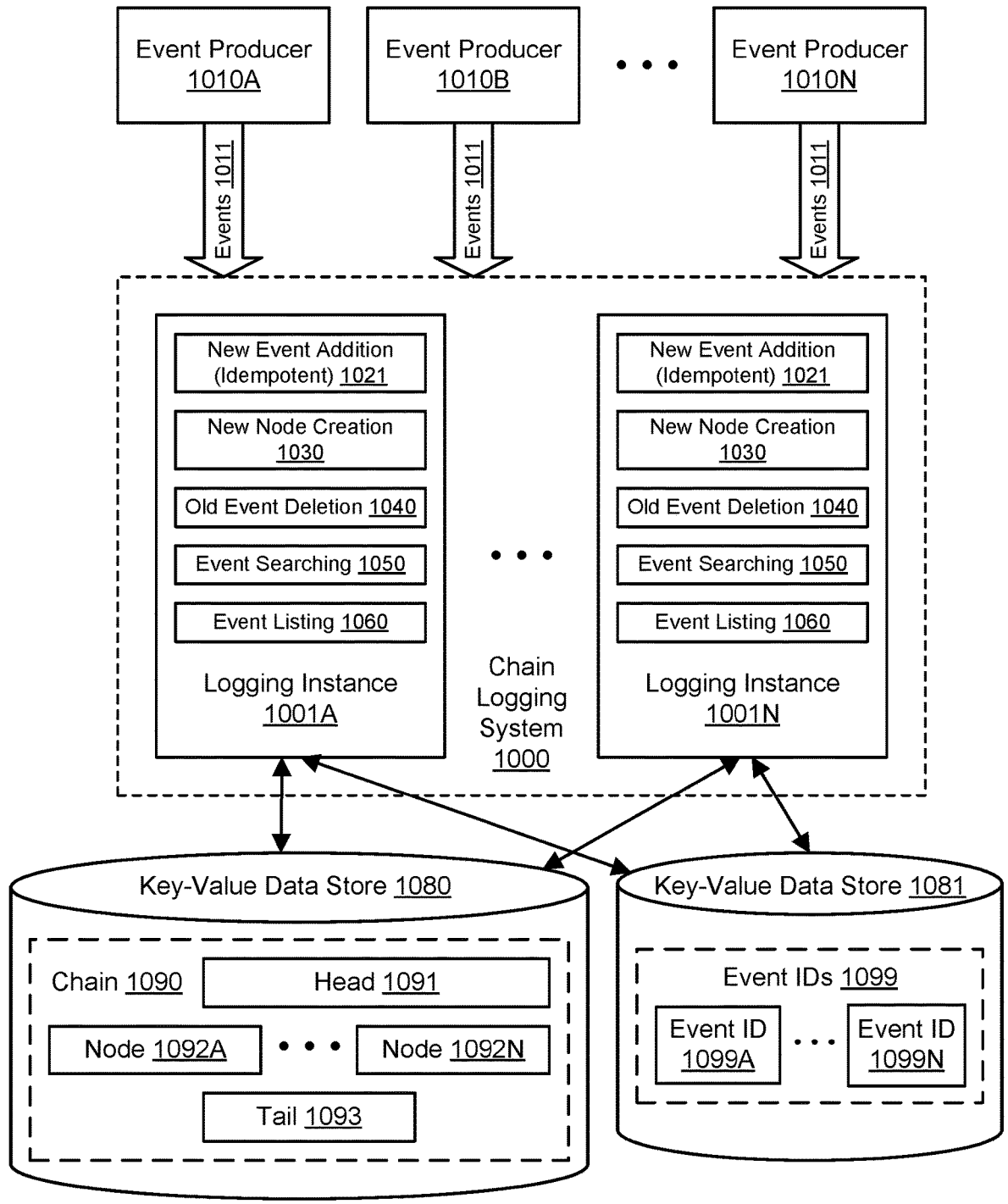
FIG. 8B illustrates further aspects of the example system environment for chain logging using key-value data storage, including a distributed set of logging instances and an idempotence property for additions to the chain, according to some embodiments.

FIG. 8B illustrates further aspects of the example system environment for chain logging using key-value data storage, including a distributed set of logging instances and an idempotence property for additions to the chain, according to one embodiment. As discussed above with respect to FIG. 5B, multiple logging instances 1001A-1001N may implement the component for new event addition (with an idempotence property) 1021. The logging instances 1001A-1001N may access the chain 1090 and the event identifiers 1099 with a degree of concurrency.

Figure 9:
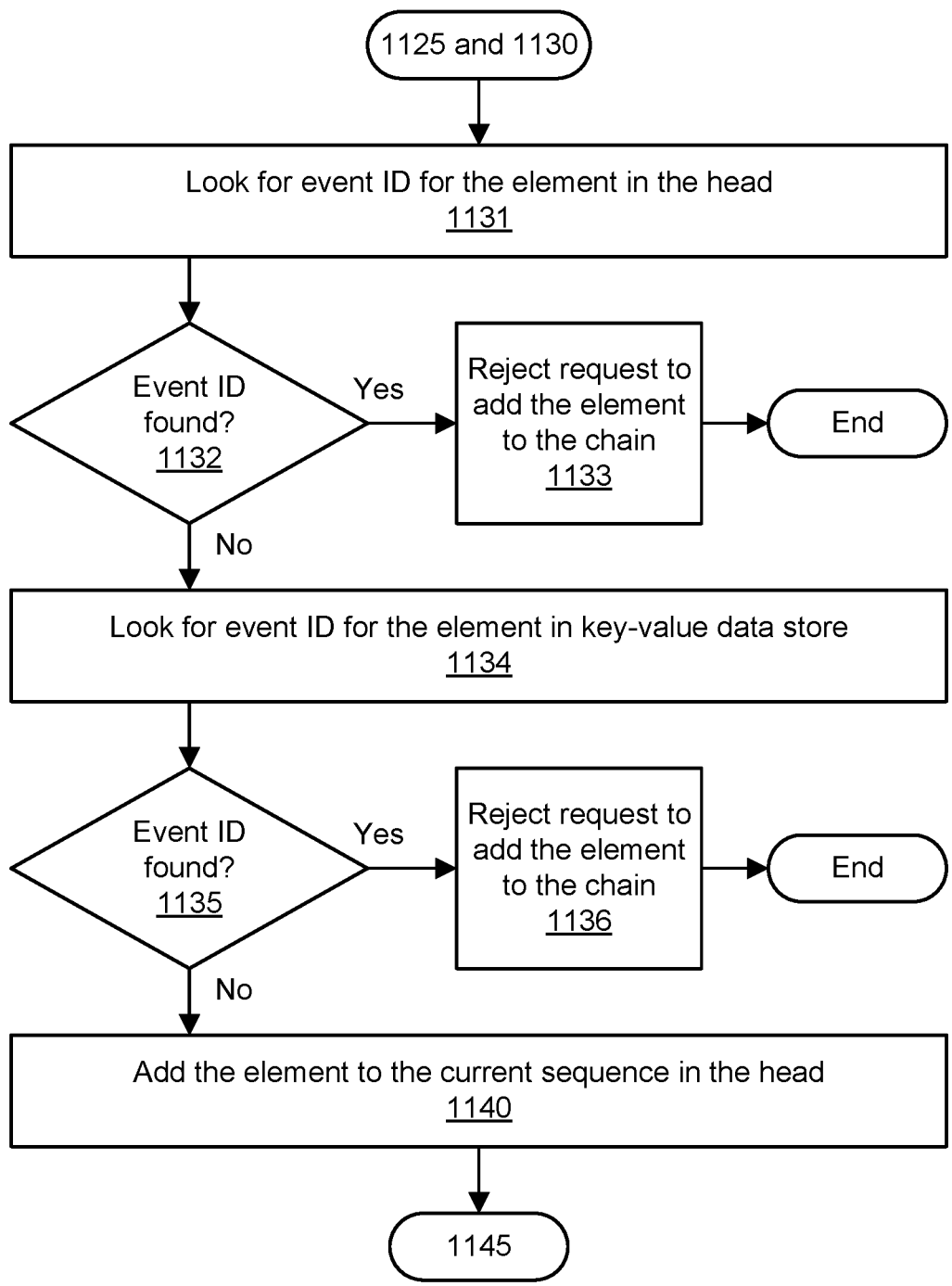
FIG. 9 illustrates further aspects of the method for adding an element to the head of a chain, including an idempotence property for additions to the chain, according to some embodiments.

FIG. 9 illustrates further aspects of the method for adding an element to the head of a chain, including an idempotence property for additions to the chain, according to one embodiment. The operations shown in FIG. 9 may be performed after the operations shown in 1125 and 1130 and before the operation shown in 1145 as illustrated previously in FIG. 6. An event identifier may be generated for an event that a client has requested to add to a particular chain. In one embodiment, the event identifier may be determined as a hash of the contents of the event.

As shown in 1131, the method may look for the event identifier in the head of the chain. As shown in 1132, it may be determined whether the event identifier was found in the head of the chain. If so, then as shown in 1133, the request to add the element may be rejected, and the method may end.

As shown in 1134, the method may look for the event identifier in the set of event identifiers in a key-value data store. As shown in 1135, it may be determined whether the event identifier was found in the set of event identifiers in the key-value data store. If so, then as shown in 1136, the request to add the element may be rejected, and the method may end.

As shown in 1140, if its event identifier was not found in either location, then the element associated with the request may be added to the current sequence in the head. The element may be added in an order with respect to any other elements in the current sequence, e.g., the order in which new events are received by the logging system. The new element may be associated with an element index that indicates the relative position of the element in the order.

Figure 10:
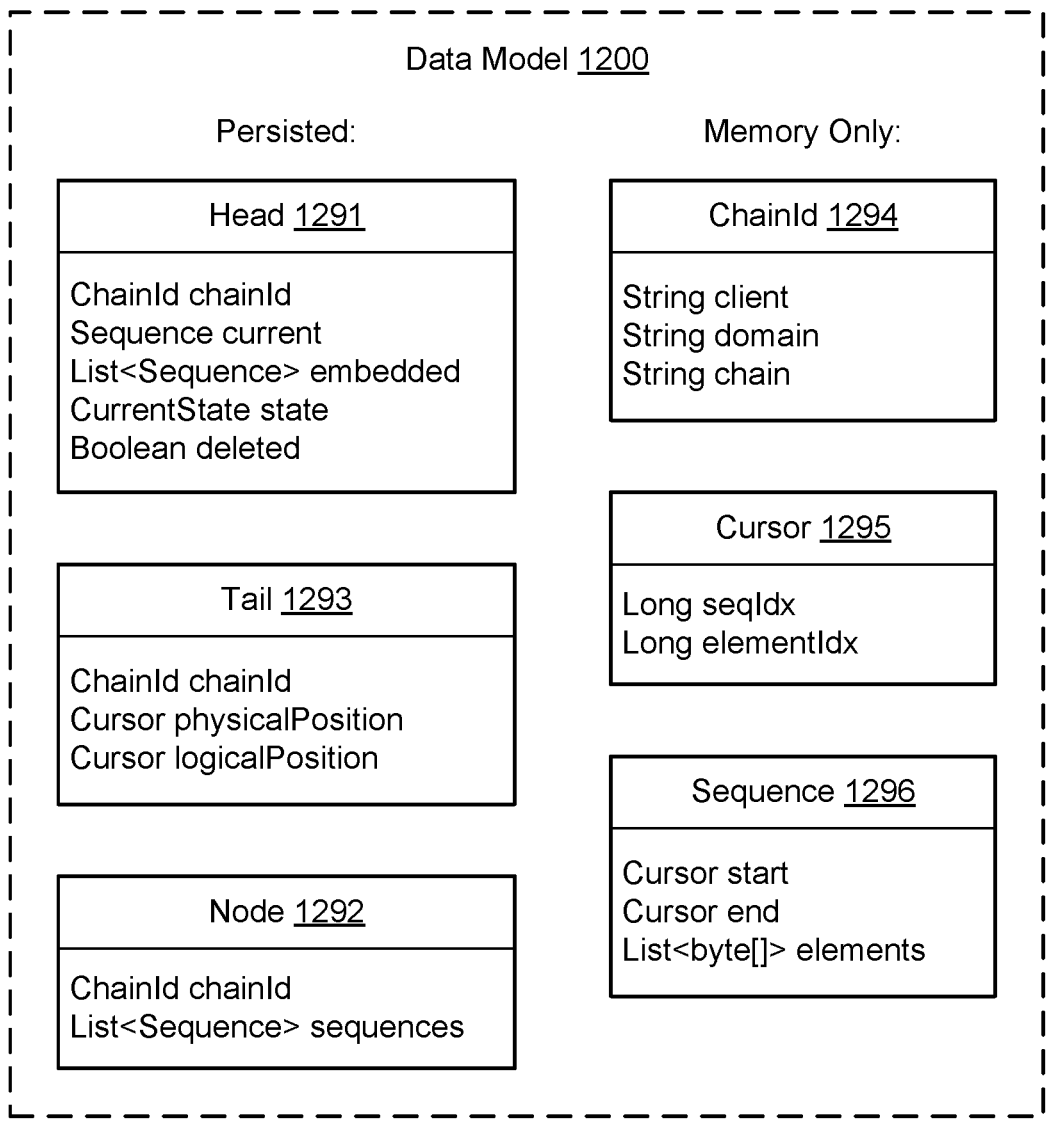
FIG. 10 illustrates an example of a data model usable for chain logging using key-value data storage, according to some embodiments.

FIG. 10 illustrates an example of a data model usable for chain logging using key-value data storage, according to one embodiment. Data structures for the head 1291, tail 1293, and node 1292 may be persisted in the key-value data store 1080. Data structures for the chainId 1294, cursor 1295, and sequence 1296 may be maintained in non-persistent memory at a logging instance or other host that accesses the chain. The head data structure 1291 may include fields for a chain identifier of type chainID, a current sequence of elements of a sequence data type, any embedded sequences of elements in a list of sequence data types, a user-defined state of type currentState, and a Boolean indicator of whether the head has been deleted. The current state may store custom information and may be passed into the push operation by the client. For example, if a chain represents updates to a gift card balance, the current state may include a numerical value representing the current balance so that the entire chain need not be traversed in order to calculate the balance at a given time. The state may be calculated and output periodically. The state field may vary in its use or meaning for chains representing different types of updates.

The tail data structure 1293 may include fields for a chain identifier of type chainID, a physicalPosition pointer of type cursor, and a logicalPosition pointer of type cursor. The node data structure 1292 may include fields for a chain identifier of type chainID and one or more sequences of elements in a list of sequence data types. The chain ID data type 1294 may include strings identifying the client, domain, and chain. The cursor data type 1295 may include long integers (or other suitable types) representing a sequence index and element index. The sequence data type 1296 may include a start cursor, an end cursor, and elements as a list of byte arrays.

In one embodiment, the logging system 1000 may offer an API for a push operation to add an element to a chain. The push API may accept an input of a chainID that identifies the chain to which to add elements. The push API may accept an input of List<byte[ ]> elements, where each element is an opaque byte[ ] of content. The supplied elements may be appended to the end of the chain. The elements may contain null or zero-length byte arrays. The push API may accept an input of byte[ ] conditionalContext [default=null] representing the known state of the head node obtained from a prior operation. If the head node has been altered by any mutating operation, the call may fail. If null, the operation may not be conditional and may simply append the values to the end of the chain. The push API may accept an input of Int maxLatestElements [default=0] representing the number of elements from the head of the chain that should be returned. Zero or fewer may return none. The logging system may return at most the elements that are stored in the head and have not yet been offloaded and dropped from the head node. Even though the head may contain non-contiguous segments of elements, the elements returned may be contiguous and may include all values up to those that were appended to the chain. Because the head node is retrieved prior to being updated internally by the buffer chain, there may be little overhead in returning it to the caller.

The push API may generate an output of Sequence latestElements representing the elements from the head just prior to the added elements. There may be at most maxLatestElements' values in this list, but no extra work of loading elements from internal nodes may need to be done. If the head contains no elements directly but has an embedded node at the end of the chain, that sequence may be returned. If there are elements directly contained in the head's current sequence, those elements will be returned. If both, the two will be combined into a joint sequence and returned. These values may be guaranteed to be contiguous and may represent the complete set of values just prior to the appended elements. The push API may generate an output of Cursor endCursor representing the position at the end of the newly added elements, where items will be added on the next push call. The push API may generate an output of byte[ ] context representing the new state of the head node which can be supplied back in the next call for a conditional operation.

The push API call may first retrieve the head of the chain. In the head may be stored a current sequence that is not yet immutable, along with any embedded sequences that are not yet offloaded to their own node. If a partition is down in storage, it may not be possible to offload some nodes. Instead of making efforts to know the status of these nodes, the logging system may simply attempt to offload them using a batch unconditional put operation. If the head node is marked isDeleted, the logging system may first call to delete the tail node to make sure that cleanup is complete before proceeding. Once that is done, the logging system may overwrite the head. For those sequences that have been successfully offloaded, the logging system may remove them from the embedded collection on the head in memory. The logging system may then add our new elements to the current sequence and increment the element index. In memory, if the elements collection exceeds a configured limit for size or count, the logging system may move the sequence to the embedded collection and start a new current sequence. Once this is done, the logging system may perform a conditional put (CPUT) of the head node back to its storage location. The cost of this operation may be 1*CGET+K*PUT+1*CPUT, where K is amortized less than 1 since on average there may be one node to offload for every push.

If the caller has supplied a conditionalContext argument that contains the entire serialized head node, the logging system may avoid the initial CGET to obtain the head node and move directly to the K*PUT offloading step. The cost tradeoff may involve returning to the caller a larger amount of information in the conditionalContext field, which may be returned back into the service in place of receiving smaller data from the client but retrieving the information from the underlying store. Since the client/service link is typically stateless and therefore cheaper than doing a quorum read from an underlying DHT, this tradeoff is typically desirable.

The offload step may be omitted in latency sensitive calls by delaying the offload and leaving the burden to a future writer. Because any writer may perform the offload step and may do so in the same manner, correctness is not impacted. However, cost and latency may increase as the head becomes larger. The offload may be executed in parallel with a head update. The head may still contain the offloaded nodes. However, if the client is chaining push requests using conditionalContext, the logging system may include in the conditionalContext whether or not it has successfully offloaded the internal nodes. This additional information may allow dropping the offloaded nodes in the subsequent request with confidence. Given these two options, the floor for a push operation may be 1*CPUT.

In one embodiment, the logging system 1000 may offer an API for a pop operation to remove one or more elements from a chain. The pop operation may remove the oldest elements from the chain by popping the oldest recorded node(s). The head may be updated to reflect the new oldest elements. Because elements are laid on the chain many to a single immutable node, if the cursor is in the middle of a node, that node may not be removed but the head may be updated to reflect the offset at which the entries are valid. The pop API may accept an input of a chainId representing the identifier of the chain from which to remove data. The pop API may accept an input of Cursor removeTo representing the position in the chain up to which values will be removed. The cursor may not be null. If the cursor points beyond the latest record, then all nodes and the head may be removed, and any trace of the chain will be gone. This may result in the chain numbering additional sequences and elements from zero if it is re-created. The pop API may accept an input of byte[ ] context [default=null] representing information returned back into the routine from the prior call. This context information may help avoid extra loads from the underlying data store.

The pop API may generate an output of Boolean isComplete, which if true indicates that the pop operation has completed and left the chain in a stable state, or if false indicates that there is more work to be done to finish the job. If isComplete is false, the chain may appear to be deleted to the desired position, but some removal work may be desired. The caller may repeatedly call the pop method with the same inputs until isComplete returns true. The pop API may generate an output of byte[ ] context representing a transient state returned to the caller for more efficient subsequent calls back into the routine. The context may contain the state of the head and tail nodes so they do not need to be loaded during extensive delete operations.

The pop operation may manipulate the tail, by shifting the pointers forward and cleaning off internal nodes. First the head and tail may be loaded. If neither exists, the chain has either been successfully cleaned up or never existed. If the head does not exist but the tail does, then the logging system has reached an invalid state since it should not dispose of the head until all other data is gone. If the tail does not exist but the head does exist, then: if the head is not marked as deleted, the logging system may create a new tail that points to the 0th node; if the head is marked deleted, the logging system have achieved a complete cleanse of the internal nodes, the tail, and all that remains to be deleted is the head. If both exist, then the logging system is in the process of deleting.

The tail may contain a pointer to the earliest node that might exist (physical delete) and a pointer to the latest point in the chain that is desired to exist after the delete operation (logical delete). The pop operation may first advance the logical cursor because that has the immediate effect on readers of showing the contents removed. The next step may be to delete nodes that are between the physical and logical cursors. The logging system may choose to delete nodes in batches or one by one. A reader of the tail may not assume that the deletes are contiguous. The pop operation may strongly guarantee that the nodes are removed before finalizing the delete by advancing the physical cursor to match the logical one. When the two are the same, no additional work may need to be done to finish the pop operation. The pop result may indicate whether the chain has physically deleted all the items that are logically deleted by returning isComplete set true.

If the tail reaches the head position, meaning that there are no longer items in the chain, then the head isDeleted may be marked true. Once that is done, the tail may be deleted, followed by the head. This sequence of operations may prevent the possibility of a tail being retained after the head is gone, which may become important if the head is re-created after being deleted. The logging system may guarantee the destruction of the tail prior to the destruction of the head.

By keeping the cleanup operations strictly separate from the push operations, the logging system may avoid interfering with the more critical additions to the chain. In this manner, the logging system may prevent pop operations from slowing down modifications to the head. By placing the tail in a separate file from the head, the logging system can run both operations independently without mutual interference. By tracking logical and physical cursors, the logging system may eliminate the need for any separate garbage collection requirement to account for all of the content. The logging system may use the data structure itself to recover from partial temporary failure and guarantee eventual cleanup. To avoid doing all work in a single call, the pop routine may limit the number of physical nodes that are deleted. Because transient failure may require extensive computation or re-work, the logging system may cap the amount of rework by advancing only the physical delete pointer on the tail. If a caller wanted to delete 10,000 entries over 1,000 nodes, the logging system may immediately set the logical pointer to delete the entire set of values. Each pop operation may only delete ten nodes then advance the physical delete pointer and leave the logical pointer at the end. Once both point to the same position, the total operation is complete.

In one embodiment, the logging system 1000 may offer an API for a seek operation to perform a k-ary search of a chain. The seek API may accept an input of a chainId that identifies the chain to search. The seek API may accept an input of Cursor start [default=tail of chain] representing the earliest bound for the search. The seek API may accept an input of Cursor end [default=head of chain] representing the latest bound for the search. The seek API may accept an input of int k [default=1] representing the number of nodes to load in parallel. This is equivalent to the k-ary nature of the search minus one. For example, if a value of 2 is supplied, then the chain may be split into 3 roughly equal sections and the 2 nodes bordering these sections may be loaded and returned. Any value less than 1 may treated as 1. The seek API may accept an input of byte[ ] context representing a means to supply search context back into the routine so we can avoid extra head loads.

The seek API may generate an output of List<Sequence> sequences representing the contents of the nodes. The seek API may generate an output of Cursor start [default=tail of chain] representing the earliest bound for the search inclusive. The seek API may generate an output of Cursor end [default=head of chain] representing the latest bound for the search exclusive. The seek API may generate an output of byte[ ] context representing the serialized state of the head node. When supplied back into the routine, the logging system may avoid needing to load the head node again for a number of edge cases. If the context was supplied, it may not be returned since it is expected to be identical.

In each seek operation, the logging system may aim to perform exactly one batch load from an underlying DHT. If the input does not contain an end cursor, the logging system may load the head and add its sequence to the output. The logging system may also serialize the head material into searchContext for return to the caller. If the tail is not present, the logging system may similarly load it and set the start cursor as output. If both were not set, these operations may be batch loaded. If either is not set, the logging system may do no further work for this round. When both the start and end are supplied, the logging system can perform a k-ary search over the nodes by computing the node identifiers between the supplied start and end. For instance, if the start and end were 10 and 150, and the caller supplied a k=6, then the logging system could divide (150-10=140) into 7 sections of size 20 and load nodes 30, 50, 70, 90, 110, and 130 in parallel. If some of the gets fail, the logging system may supply back what we received. If all of the gets fail, then the call fails. If searchContext was not supplied in the call, the logging system may also load the head as part of the batch and supply it back as searchContext, but not include its sequence. This context may be used to patch parts of the chain that may not be offloaded as their own nodes yet but are still embedded in the head.

In one embodiment, the logging system 1000 may offer an API for a list operation to perform sequential paging of a chain. The list API may accept an input of a chainId that identifies the chain to search. The list API may accept an input of Cursor position [default=tail of chain] representing the position from which to list. The list API may accept an input of boolean forward [default=true] which, if true, lists the items starting at the position cursor between the cursor and the head (new items, forward in time) and, if false, loads the items between the cursor and the tail (older items, backwards in time). Regardless of this setting, the returned sequence may itself be ordered the same direction, with the oldest element at the front of the array. The list API may accept an input of byte[ ] context [default=null] representing a means to supply search context back into the routine so we can avoid extra head loads. The list API may accept an input of int maxNodes [default=5, max=100] representing the maximum number of nodes to return.

The list API may generate an output of List<Sequence> sequences representing the contents of the listed nodes. The list API may generate an output of byte[ ] context representing the serialized state of the head. When supplied back into the routine, the logging system may avoid needing to load the head again for a number of edge cases. If context was supplied in, it may not be returned.

In each list operation, the logging system may aim to perform exactly one batch read from the underlying DHT. If the input does not contain a position cursor, the logging system may first load the tail to determine the end of the chain. Given a position and a direction, the logging system may get the contiguous 'maxNodes' from the cursor in the direction defined by 'forward' in a batch operation from the DHT. Call failures may be re-attempted, and any missing sections may be filled in using the head. The head may have been supplied in context, but if not it may be requested as part of the batch get operation and then returned to the caller in the context field.

Illustrative Computer System

Figure 11:
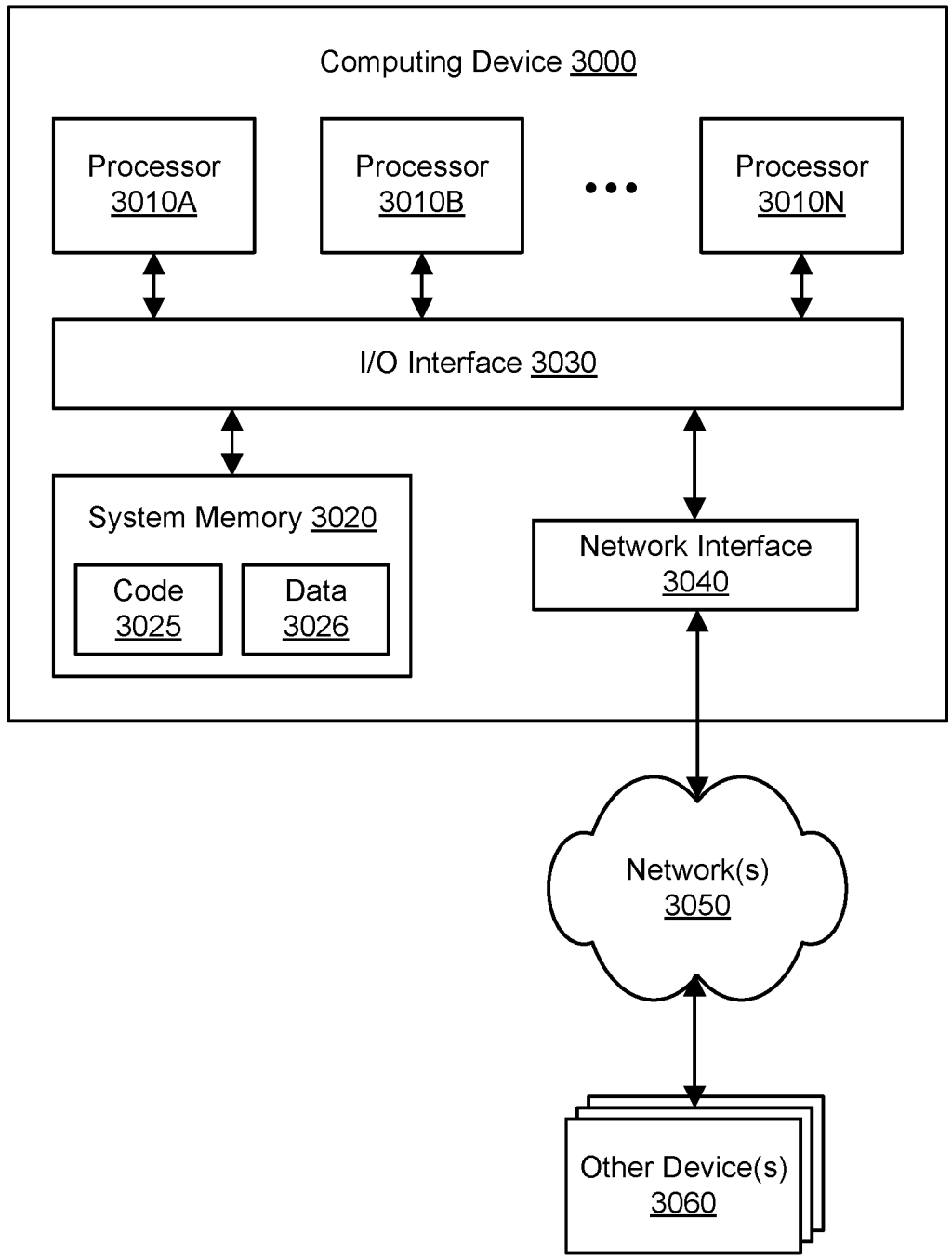
FIG. 11 illustrates an example computing device that may be used in some embodiments.

In at least some embodiments, a computer system that implements a portion or all of one or more of the technologies described herein may include a computer system that includes or is configured to access one or more computer-readable media. FIG. 11 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 11 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a data store storing a plurality of shards of a stream representing a globally ordered sequence of events;
a load balancer; and
a plurality of hosts comprising a first host and a second host, wherein the first host comprises a first one or more processors and a first one or more memories to store first computer-executable instructions that, if executed, cause the first one or more processors to:
receive, from the load balancer, a request to store an event in the stream, wherein the request is associated with a stream identifier, wherein the stream identifier indicates a number of shards in the stream, and wherein the number is at least two;
generate an additional shard of the stream in the data store, wherein the additional shard is generated based at least in part on one or more performance metrics associated with the first host; and
send, to the second host, the request to store the event, information descriptive of one or more of the plurality of hosts and one or more of the plurality of shards including the additional shard, and a timestamp associated with the first host; and
wherein the second host comprises a second one or more processors and a second one or more memories to store second computer-executable instructions that, if executed, cause the second one or more processors to:
store, in the additional shard in the data store, the event, a timestamp of the event, and an identifier of the second host, wherein metadata associated with the event places the event in the globally ordered sequence, and wherein the globally ordered sequence includes one or more earlier events in one or more other shards of the stream; and
send, to the first host, additional information descriptive of one or more of the plurality of hosts and one or more of the plurality of shards and a timestamp associated with the second host.

2. The system as recited in claim 1, wherein the timestamp of the event is determined based at least in part on the timestamp associated with the first host and the timestamp associated with the second host, and wherein the timestamp of the event is later than timestamp of a preceding event in the another shard of the stream.

3. The system as recited in claim 1, wherein the globally ordered sequence is approximated using sorted event identifiers of the event and the one or more earlier events.

4. The system as recited in claim 1, wherein the information descriptive of one or more of the plurality of hosts and one or more of the plurality of shards indicates an ownership of one or more of the shards by one or more of the hosts and an unowned status of the additional shard.

5. A method, comprising:
generating, by a first host of a plurality of hosts, an additional chain of a stream comprising a plurality of chains, wherein the stream represents a globally ordered sequence of events;
sending, from the first host to a second host of the plurality of hosts, information descriptive of the additional chain;
receiving, at the second host, a request to store a data object representing an event, wherein the request is associated with a stream identifier of the stream;
selecting, by the second host, the additional chain of the stream; and
storing, by the second host in the additional chain, the data object, a timestamp associated with the data object, and an identifier of the second host, wherein the data object in the additional chain is associated with a position in the globally ordered sequence across the plurality of chains.

6. The method as recited in claim 5, further comprising:
sending, from the first host to the second host, the request to store the data object, information descriptive of the plurality of hosts and the plurality of chains, and a timestamp associated with the first host; and
sending, from the second host to the first host, additional information descriptive of the plurality of hosts and the plurality of chains and a timestamp associated with the second host.

7. The method as recited in claim 6, wherein the information descriptive of one or more of the plurality of hosts and one or more of the plurality of chains indicates an unowned status of the additional chain.

8. The method as recited in claim 5, further comprising:
receiving, at the first host from a load balancer, an additional request to store an additional data object representing an additional event, wherein the additional request is associated with the stream identifier of the stream;
determining, by the first host, an additional selected chain of the plurality of chains based at least in part on the stream identifier;
determining, by the first host, that the additional selected chain has not been modified by another host; and
storing, by the first host in the additional selected chain, the data object and a timestamp associated with the additional event.

9. The method as recited in claim 5, further comprising:
determining, by the second host, the timestamp associated with the data object based at least in part on a time at the first host and a time at the second host, wherein the timestamp associated with the data object is later than a timestamp of a preceding event in the stream.

10. The method as recited in claim 5, further comprising:
storing an additional data object in a chain of the plurality of chains, wherein the additional data object is stored with metadata indicating an identifier of the data object and a relative position of the additional object with respect to the data object in the globally ordered sequence.

11. The method as recited in claim 5, further comprising:
determining a set of events occurring before or after the event represented by the data object stored in the additional chain, wherein the set of events comprises one or more events occurring before or after the event in the additional chain, and wherein the set of events comprises one or more events in one or more other chains of the stream that are indicated as happening before or happening after the event.

12. The method as recited in claim 5, wherein the additional chain is generated based at least in part on a throughput metric associated with the first host.

13. The method as recited in claim 5, further comprising:
removing a chain from the plurality of chains of the stream based at least in part on one or more metrics.

14. One or more non-transitory computer-readable storage media storing program instructions that, when executed on or across one or more processors, perform:
generating, by a first host of a plurality of hosts, an additional chain of a stream comprising a plurality of chains, wherein the stream stores a globally ordered sequence of events using a data store, and wherein the additional chain is generated based at least in part on one or more performance metrics associated with the first host;
sending, from the first host to a second host of the plurality of hosts, information descriptive of an unowned status of the additional chain;
receiving, at the second host, a request to store an event, wherein the request is associated with a stream identifier of the stream;
selecting, by the second host, the additional chain of the stream; and
storing, by the second host in the additional chain, the event, a timestamp associated with the event, and an identifier of the second host, wherein the event in the additional chain is associated with a position in the globally ordered sequence across the plurality of chains.

15. The one or more non-transitory computer-readable storage media as recited in claim 14, further comprising additional program instructions that, when executed on or across the one or more processors, perform:
sending, from the first host to the second host, the request to store the event, information descriptive of the plurality of hosts and the plurality of chains, and a timestamp associated with the first host; and
sending, from the second host to the first host, additional information descriptive of the plurality of hosts and the plurality of chains and a timestamp associated with the second host.

16. The one or more non-transitory computer-readable storage media as recited in claim 14, further comprising additional program instructions that, when executed on or across the one or more processors, perform:
determining, by the second host, the timestamp associated with the event based at least in part on a time at the first host and a time at the second host, wherein the timestamp associated with the event is later than a timestamp of a preceding event in the stream.

17. The one or more non-transitory computer-readable storage media as recited in claim 14, further comprising additional program instructions that, when executed on or across the one or more processors, perform:
storing an additional event in a chain of the plurality of chains, wherein the additional event is stored with metadata indicating an identifier of the event and a relative position of the additional object with respect to the event in the globally ordered sequence.

18. The one or more non-transitory computer-readable storage media as recited in claim 14, further comprising additional program instructions that, when executed on or across the one or more processors, perform:
determining a set of events occurring before or after the event in the additional chain, wherein the set of events comprises one or more events occurring before or after the event in the additional chain, and wherein the set of events comprises one or more events in one or more other chains of the stream that are indicated as happening before or happening after the event.

19. The one or more non-transitory computer-readable storage media as recited in claim 14, further comprising additional program instructions that, when executed on or across the one or more processors, perform:
removing a chain from the plurality of chains of the stream based at least in part on one or more metrics.

20. The one or more non-transitory computer-readable storage media as recited in claim 14, wherein the chain comprises a parent of a child chain, and wherein the chain is removed after the child chain is removed.

* * * * *